US012120667B2

(12) United States Patent
Liu et al.

(10) Patent No.: US 12,120,667 B2
(45) Date of Patent: Oct. 15, 2024

(54) REFERENCE SIGNAL TRANSMISSION METHOD AND APPARATUS

(71) Applicant: HUAWEI TECHNOLOGIES CO., LTD., Guangdong (CN)

(72) Inventors: Xianda Liu, Beijing (CN); Kunpeng Liu, Beijing (CN); Liuliu Ji, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 17/737,526

(22) Filed: May 5, 2022

(65) Prior Publication Data

US 2022/0272728 A1 Aug. 25, 2022

Related U.S. Application Data

(63) Continuation of application No. PCT/CN2019/116878, filed on Nov. 8, 2019.

(51) Int. Cl.
| | |
|---|---|
| *H04W 72/1263* | (2023.01) |
| *H04L 5/00* | (2006.01) |
| *H04W 16/28* | (2009.01) |
| *H04W 72/0446* | (2023.01) |
| *H04W 72/0453* | (2023.01) |

(52) U.S. Cl.
CPC ....... *H04W 72/1263* (2013.01); *H04L 5/0051* (2013.01); *H04W 16/28* (2013.01); *H04W 72/0446* (2013.01); *H04W 72/0453* (2013.01)

(58) Field of Classification Search
CPC ............. H04W 72/1263; H04W 16/28; H04W 72/0446; H04W 72/0453; H04L 5/0051; H04L 5/0035; H04L 5/0094; H04L 5/0048
See application file for complete search history.

(56) References Cited

U.S. PATENT DOCUMENTS

| | | | | |
|---|---|---|---|---|
| 2019/0166615 A1* | 5/2019 | Nimbalker | ............ | H04W 72/21 |
| 2019/0261329 A1* | 8/2019 | Park | ...................... | H04L 5/0048 |
| 2020/0008102 A1* | 1/2020 | Yokomakura | ......... | H04L 1/0003 |
| 2021/0083816 A1* | 3/2021 | Werner | ................. | H04L 5/0023 |
| 2022/0264584 A1* | 8/2022 | Fan | ....................... | H04L 5/0051 |

(Continued)

FOREIGN PATENT DOCUMENTS

| | | |
|---|---|---|
| CN | 108631987 A | 10/2018 |
| CN | 110214466 A | 9/2019 |
| WO | 2018171792 A1 | 9/2018 |

OTHER PUBLICATIONS

Extended European Search Report issued in European Application No. 19951969.5 on Sep. 27, 2022, 11 pages.

(Continued)

*Primary Examiner* — Abdullahi Ahmed
(74) *Attorney, Agent, or Firm* — Fish & Richardson P.C.

(57) ABSTRACT

This application provides a reference signal transmission method and an apparatus, used in a multipoint coordination transmission scenario. In one example method, a frequency domain resource that carries a target reference signal in a frequency domain resource or a time domain resource that is associated with each QCL assumption may be separately determined, and then the target reference signal carried on the frequency domain resource that is associated with the QCL assumption is separately received by using the corresponding QCL assumption.

20 Claims, 11 Drawing Sheets

(56) References Cited

U.S. PATENT DOCUMENTS

| | | | | |
|---|---|---|---|---|
| 2022/0361005 | A1* | 11/2022 | Khoshnevisan | H04B 7/0408 |
| 2023/0081073 | A1* | 3/2023 | Wen | H04B 1/713 |
| | | | | 375/132 |
| 2023/0254863 | A1* | 8/2023 | Jiang | H04L 5/0026 |
| | | | | 370/329 |
| 2023/0308242 | A1* | 9/2023 | Ji | H04B 7/01 |

OTHER PUBLICATIONS

Samsung, "On DL PT-RS Design," 3GPP TSG RAN WG1 NR Ad-hoc #2, R1-1710686, Qingdao, China, Jun. 27-30, 2017, 5 pages.

Spreadtrum Communications, "Considerations on PT-RS for CP-OFDM," 3GPP TSG RAN WG1 Meeting NR #3, R1-1715513, Nagoya, Japan, Sep. 18-21, 2017, 4 pages.

3GPP TS 38.211 V15.7.0 (Sep. 2019), "3rd Generation Partnership Project; Technical Specification Group Radio Access Network; NR; Physical channels and modulation (Release 15)," Sep. 2019, 97 pages.

3GPP TS 38.213 V15.7.0 (Sep. 2019), "3rd Generation Partnership Project; Technical Specification Group Radio Access Network; NR; Physical layer procedures for control (Release 15)," Sep. 2019, 108 pages.

3GPP TS 38.214 V15.7.0 (Sep. 2019), "3rd Generation Partnership Project; Technical Specification Group Radio Access Network; NR; Physical layer procedures for data (Release 15)," Sep. 2019, 106 pages.

ETRI, "Discussion on phase tracking RS design," 3GPP TSG RAN WG1 Meeting #88, R1-1702345, Athens, Greece, Feb. 13-17, 2017, 6 pages.

PCT International Search Report and Written Opinion issued in International Application No. PCT/CN2019/116878 on Aug. 11, 2020, 15 pages (with English translation).

* cited by examiner $N_{RB}$ = 8 RBs
Frequency domain density K = 4   ⊠ RB carrying a PTRS
determined based on $N_{RB}$ $N_{RB}$ = 8 RBs
A PRG indication is a wideband

REFERENCE SIGNAL TRANSMISSION METHOD AND APPARATUS

CROSS-REFERENCE TO RELATED APPLICATIONS

This application is a continuation of International Application No. PCT/CN2019/116878, filed on Nov. 8, 2019, the disclosure of which is hereby incorporated by reference in its entirety.

TECHNICAL FIELD

This application relates to the field of communication technologies, and in particular, to a reference signal transmission method and an apparatus.

BACKGROUND

To increase a capacity of a communication system, a next-generation 5G communication system is shifting to a higher millimeter wave frequency. However, because frequency oscillators of a transmitter and a receiver are mismatched, a millimeter wave device is severely affected by phase noise. For an adverse effect caused by the phase noise, the next-generation 5G communication system may use a phase tracking reference signal (PTRS) to perform channel estimation to estimate the effect of the phase noise on a signal and partially compensates for signal distortion caused by the phase noise. The PTRS is mapped only to a time-frequency resource occupied by a physical downlink shared channel (PDSCH), and is mapped by using a specific time domain density and a specific frequency domain density.

In a multipoint coordination transmission scenario, a plurality of stations may support transmission of a same PDSCH, and transmission paths of various stations vary greatly. Therefore, different QCL assumptions are used for data and reference signals such as DMRSs transmitted by various stations. The QCL assumption is used to indicate a large-scale parameter used for channel estimation, and further, the large-scale parameter is used to receive a reference signal such as a PTRS or a DMRS, to perform channel estimation. Correspondingly, because time-frequency resources occupied by different stations to transmit a same PDSCH may also be different, total time domain resources for scheduling the PDSCH may respectively correspond to at least two QCL assumptions.

However, if in this scenario, a time domain density and a frequency domain density used for the PTRS are still determined by using a mechanism similar to that used in a single-station scenario, that is, determined based on total frequency domain resources (namely, scheduled time-frequency resources) occupied by the PDSCH, PTRSs corresponding to various QCL assumptions are sparsely distributed, resulting in inaccurate phase estimation and poor transmission performance.

SUMMARY

This application provides a reference signal transmission method and an apparatus, to improve accuracy of channel estimation.

According to a first aspect, this application provides a reference signal transmission method. In the method, scheduled frequency domain resources include a first frequency domain resource and a second frequency domain resource. A receive end may determine a frequency domain density K of a target reference signal based on a quantity $M_{RB}$ of frequency domain resources; determine, based on the frequency domain density K, a third frequency domain resource that carries the target reference signal in the first frequency domain resource and a fourth frequency domain resource that carries the target reference signal in the second frequency domain resource. The first frequency domain resource is associated with a first QCL assumption, and the second frequency domain resource is associated with a second QCL assumption. The receive end may receive, by using the first QCL assumption, the target reference signal carried on the third frequency domain resource, and/or receive, by using the second QCL assumption, the target reference signal carried on the fourth frequency domain resource.

A quantity $M_{RB}$ of frequency domain resources is greater than zero and less than $N_{RB}$, and $N_{RB}$ is a quantity of scheduled frequency domain resources.

It can be learned that the frequency domain density K determined by using $M_{RB}$ in the reference signal transmission method is small. Because the frequency domain density K means that a target reference signal is mapped once at an interval of K frequency domain resource blocks, smaller K indicates a denser target reference signal carried on a frequency domain resource. In this way, accuracy of channel estimation can be improved.

A target reference signal port corresponding to the target reference signal carried on the third frequency domain resource is associated with a DMRS port corresponding to a demodulation reference signal DMRS carried on the first frequency domain resource, and a target reference signal port corresponding to the target reference signal carried on the fourth frequency domain resource is associated with a DMRS port corresponding to a DMRS carried on the second frequency domain resource.

The target reference signal port is associated with the DMRS port, and the target reference signal corresponding to the target reference signal port may be measured based on the DMRS corresponding to the DMRS port, to obtain a QCL assumption and further receive a PTRS by using the QCL assumption. Channel estimation is performed by using the target reference signal, and the DMRS corresponding to the DMRS port is received by using a channel estimation result and the QCL assumption. Alternatively, the receive end may further assist channel estimation of the DMRS by using a channel estimation result of the target reference signal corresponding to the target reference signal port.

In an optional implementation, $M_{RB}$ is equal to dividing $N_{RB}$ by $N_{QCL}$ and performing a ceiling operation, or is equal to dividing $N_{RB}$ by $N_{QCL}$ and performing a floor operation, and $N_{QCL}$ is a total quantity of QCL assumptions associated with the scheduled frequency domain resources. The total quantity is a quantity of TCI states or QCL assumptions indicated by a TCI field in DCI.

Optionally, the first frequency domain resource and the second frequency domain resource are used to carry a PDSCH or a PUSCH.

Optionally, when the first frequency domain resource and the second frequency domain resource are used to carry the PUSCH, the QCL assumption includes only a type D.

Optionally, $N_{QCL}$ is 2.

Optionally, $N_{QCL}$ is a quantity of TCI states indicated by a TCI field in DCI.

Optionally, $N_{QCL}$ is a quantity of TCI states indicated by a TCI field configured by using RRC signaling.

Optionally, $M_{RB}$ is equal to dividing $N_{RB}$ by $N_{QCL}$.

In another optional implementation, $M_{RB}$ is equal to a quantity of first frequency domain resources, or is equal to a quantity of second frequency domain resources. In other words, $M_{RB}$ is equal to a quantity of RBs of a frequency domain resource associated with one QCL assumption in all RBs occupied by a scheduled PDSCH.

In an optional implementation, the determining, based on the frequency domain density K, a third frequency domain resource that carries the target reference signal in the first frequency domain resource and a fourth frequency domain resource that carries the target reference signal in the second frequency domain resource includes: mapping the target reference signal once starting from a reference frequency domain resource block in the scheduled frequency domain resources at an interval of K frequency domain resource blocks, to obtain frequency domain resource blocks that carry the target reference signal; and selecting one or more frequency domain resource blocks belonging to the first frequency domain resource as the third frequency domain resource from the frequency domain resource blocks that carry the target reference signal; and/or selecting one or more frequency domain resource blocks belonging to the second frequency domain resource as the fourth frequency domain resource from the frequency domain resource blocks that carry the target reference signal.

In an implementation, "mapping the target reference signal once at an interval of K frequency domain resource blocks" indicates that the reference frequency domain resource block is used as a start position, and the frequency domain resource blocks that carry the target reference signal are obtained at the interval of K frequency domain resource blocks until the last frequency domain resource block occupied by a shared channel.

In another implementation, "mapping the target reference signal once at an interval of K frequency domain resource blocks" indicates that the reference frequency domain resource block is used as a start position, and the frequency domain resource blocks that carry the target reference signal are obtained at an interval of K frequency domain resource blocks until the last frequency domain resource block occupied by a shared channel.

In another optional implementation, the determining, based on the frequency domain density K, a third frequency domain resource that carries the target reference signal in the first frequency domain resource and/or a fourth frequency domain resource that carries the target reference signal in the second frequency domain resource includes: mapping a PTRS once starting from a reference frequency domain resource block in the first frequency domain resource at an interval of K frequency domain resource blocks, to obtain frequency domain resource blocks that carry the target reference signal as the third frequency domain resource; and mapping a PTRS once starting from a reference frequency domain resource block in the second frequency domain resource at an interval of K frequency domain resource blocks, to obtain frequency domain resource blocks that carry the target reference signal as the fourth frequency domain resource.

It can be learned that this implementation is compared with the previous implementation in which the frequency domain resource that carries the target reference signal is determined. In the previous implementation, mapping is performed starting from the reference frequency domain resource block in the entire scheduled frequency domain resources for determining. However, in this implementation, mapping is performed starting from the reference frequency domain resource block in the first frequency domain resource to determine the third frequency domain resource, and mapping is performed starting from the reference frequency domain resource block in the second frequency domain resource to determine the fourth frequency domain resource. In this implementation, when frequency domain resources associated with the QCL assumptions are not consecutive, this helps avoid a case in which some frequency domain resources associated with the QCL assumptions do not carry the target reference signal.

In this embodiment of this application, the target reference signal is a reference signal used to perform channel estimation or used to assist the demodulation reference signal DMRS in performing channel estimation. Optionally, the target reference signal includes a phase tracking reference signal PTRS. The target reference signal is associated with the DMRS.

According to a second aspect, this application further provides a reference signal transmission method. In the reference signal transmission method, scheduled frequency domain resources include a first frequency domain resource and a second frequency domain resource, the first frequency domain resource is associated with a first QCL assumption, and the second frequency domain resource is associated with a second QCL assumption.

In a first case, when a target reference signal carried on the scheduled frequency domain resources has one QCL assumption, a PTRS is mapped to a frequency domain resource associated with the QCL assumption. In the reference signal transmission method, a method for determining a frequency domain density K is the same as that in the first aspect, and details are not described herein again.

If the target reference signal is associated with a DMRS carried on the first frequency domain resource, the target reference signal may be received by using the first QCL assumption, and/or a channel estimation result of the target reference signal may be used to assist in receiving the DMRS carried on the first frequency domain resource; and one or more frequency domain resource blocks that are obtained by mapping the target reference signal once starting from a reference frequency domain resource block in the first frequency domain resource at an interval of K frequency domain resource blocks are used as a frequency domain resource that carries the target reference signal.

If the target reference signal is associated with a DMRS carried on the second frequency domain resource, the target reference signal may be received by using the second QCL assumption, and/or a channel estimation result of the target reference signal may be used to assist in receiving the DMRS carried on the second frequency domain resource; and one or more frequency domain resource blocks that are obtained by mapping the target reference signal once starting from a reference frequency domain resource block in the second frequency domain resource at an interval of K frequency domain resource blocks are used as a frequency domain resource that carries the target reference signal.

It can be learned that the reference signal transmission method can specify a transmission rule of the target reference signal, to avoid a problem that transmission performance is affected due to an unclear rule.

In a second case, when a target reference signal carried on the scheduled frequency domain resources has one QCL assumption, the target reference signal is mapped to frequency domain resources associated with two QCL assumptions, but one of the QCL assumptions is used for receiving the target reference signal. A phase estimation result of the target reference signal may be shared with the two QCL assumptions.

A manner in which the target reference signal is mapped to the scheduled frequency domain resources and the frequency domain density K of the target reference signal may be determined based on the scheduled frequency domain resources. A manner of receiving the target reference signal is receiving, by using the first QCL assumption or the second QCL assumption, the target reference signal carried on the scheduled frequency domain resources. Further, a channel estimation result based on a PTRS may be used to separately assist in receiving a DMRS carried on the first frequency domain resource and receiving a DMRS carried on the second frequency domain resource.

It can be learned that when the target reference signal has one QCL assumption, the reference signal transmission method can specify a transmission rule of the target reference signal, to avoid a problem that channel estimation performance is affected due to an unclear rule.

In a third case, different QCL assumptions are used to receive data and DMRSs on a same time-frequency domain resource, and the data and the DMRSs corresponding to the different QCL assumptions correspond to different ports, or the different QCL assumptions correspond to different CDM groups of DMRSs. A target reference signal on the time-frequency domain resource is limited to be received by using one QCL assumption. In other words, one port is configured for the target reference signal, and a target reference signal port is associated with a corresponding QCL assumption on the time-frequency resource.

Optionally, the QCL assumption is used to receive the target reference signal on the target reference signal port.

Optionally, an association relationship between the target reference signal port and the corresponding QCL assumption on the time-frequency resource may be predefined. Specifically, when a TCI field indicates two TCI states, the $1^{st}$ TCI state is used to indicate the QCL assumption of the target reference signal by default, or the $2^{nd}$ TCI state is used to indicate the QCL assumption of the target reference signal by default.

Optionally, the target reference signal port is associated with one or more DMRS ports, or is associated with one or more CDM groups. A TCI state corresponding to the DMRS port or the CDM is the same as the TCI state corresponding to the target reference signal port.

Optionally, the target reference signal port and the associated DMRS port or the associated CDM group have the same TCI state or the same QCL assumption. Specifically, the TCI state or the QCL assumption includes one or more of QCL assumptions type A, type B, and type D.

Optionally, the target reference signal port and an unassociated DMRS port or an unassociated code division multiplexing (CDM) group have different TCI states or different QCL assumptions.

Optionally, if the target reference signal port and the unassociated DMRS port or the unassociated CDM group have the different TCI states or the different QCL assumptions, the target reference signal port and the unassociated DMRS port have the same QCL assumption type B.

Optionally, the first frequency domain resource and the second frequency domain resource are used to carry a PDSCH or a PUSCH.

Optionally, when the first frequency domain resource and the second frequency domain resource are used to carry the PUSCH, the QCL assumption includes only a type D.

According to a third aspect, this application further provides a reference signal transmission method. In the reference signal transmission method, a frequency domain density of a target reference signal may be determined by using the foregoing $M_{RB}$ or $N_{RB}$. However, a manner of mapping the target reference signal to scheduled frequency domain resources or a manner of determining a frequency domain resource that carries the target reference signal in scheduled frequency domain resources may be separately mapped or determined for frequency domain resources associated with different QCL assumptions.

When the target reference signal carried on the scheduled frequency domain resources has two QCL assumptions, the reference signal transmission method includes: A receive end determines the frequency domain density of the target reference signal based on $M_{RB}$ or $N_{RB}$. One or more frequency domain resource blocks that are obtained by mapping the target reference signal once by the receive end starting from a reference frequency domain resource block in a first frequency domain resource at an interval of K frequency domain resource blocks are used as a third frequency domain resource that carries the target reference signal. One or more frequency domain resource blocks that are obtained by mapping the target reference signal once starting from a reference frequency domain resource block in a second frequency domain resource at an interval of K frequency domain resource blocks are used as a fourth frequency domain resource that carries the target reference signal. The receive end receives, by using a first QCL assumption, the target reference signal carried on the third frequency domain resource, and receives, by using a second QCL assumption, the target reference signal carried on the fourth frequency domain resource.

Optionally, the receive end respectively determines the third frequency domain resource and the fourth frequency domain resource in the first frequency domain resource and the second frequency domain resource based on a same frequency domain density, and maps the target reference signal to each of the third frequency domain resource and the fourth frequency domain resource.

Optionally, the target reference signal is mapped to each of the third frequency domain resource and the fourth frequency domain resource.

Optionally, the first frequency domain resource and the second frequency domain resource are used to carry a PDSCH or a PUSCH.

Optionally, when the first frequency domain resource and the second frequency domain resource are used to carry the PUSCH, the QCL assumption includes only a type D.

It can be learned that in the reference signal transmission method, a frequency domain resource associated with each QCL assumption carries the target reference signal, to facilitate channel estimation performance corresponding to each QCL assumption.

According to a fourth aspect, this application further provides a reference signal transmission method. In the reference signal transmission method, it is ensured that a time domain resource associated with each QCL assumption carries a target reference signal, to help ensure channel estimation performance of each QCL assumption.

When a PTRS carried on scheduled time domain resources may have two QCL assumptions, in the reference signal transmission method, a receive end determines a time domain density L of the target reference signal based on modulation and coding scheme MCS information; maps the target reference signal once starting from a reference time domain resource block in a first time domain resource at an interval of L time domain resource blocks, to obtain a third time domain resource that carries the target reference signal; maps the target reference signal once starting from a reference time domain resource block in a second time domain resource at an interval of L time domain resource blocks, to obtain a fourth time domain resource that carries the target reference signal; and receives, by using a first QCL assumption, the target reference signal carried on the third time domain resource, and receives, by using a second QCL assumption, the target reference signal carried on the fourth time domain resource.

The MCS information is used to indicate a modulation and coding scheme of the scheduled time domain resources. The scheduled time domain resources include the first time domain resource and the second time domain resource. The first time domain resource is associated with the first QCL assumption, and the second time domain resource is associated with the second QCL assumption.

A target reference signal port corresponding to the target reference signal carried on the third time domain resource is associated with a DMRS port corresponding to a demodulation reference signal DMRS carried on the first time domain resource. A target reference signal port corresponding to the target reference signal carried on the fourth time domain resource is associated with a DMRS port corresponding to a demodulation reference signal DMRS carried on the second time domain resource.

In this embodiment of this application, the target reference signal is a reference signal used to perform channel estimation or used to assist the demodulation reference signal DMRS in performing channel estimation.

In this embodiment of this application, the target reference information includes a phase tracking reference signal PTRS.

Optionally, the first frequency domain resource and the second frequency domain resource are used to carry a PDSCH or a PUSCH.

Optionally, when the first frequency domain resource and the second frequency domain resource are used to carry the PUSCH, the QCL assumption includes only a type D.

According to a fifth aspect, this application further provides a reference signal transmission method. The method is corresponding to the methods in the first aspect and the second aspect, and is described from a perspective of a transmit end.

In the reference signal transmission method, the transmit end determines a frequency domain density K of a target reference signal based on a quantity $M_{RB}$ of frequency domain resources; determines, based on the frequency domain density K, a third frequency domain resource that carries the target reference signal in a first frequency domain resource, and/or a fourth frequency domain resource that carries the target reference signal in a second frequency domain resource; and sends, by using a first quasi co-location QCL assumption, the target reference signal carried on the third frequency domain resource, and/or sends, by using a second quasi co-location QCL assumption, the target reference signal carried on the fourth frequency domain resource.

The quantity $M_{RB}$ of frequency domain resources is greater than zero and less than $N_{RB}$, $N_{RB}$ is a quantity of scheduled frequency domain resources, and the scheduled frequency domain resources include the first frequency domain resource and the second frequency domain resource. The first frequency domain resource is associated with the first quasi co-location QCL assumption, and the second frequency domain resource is associated with the second QCL assumption.

A target reference signal port corresponding to the target reference signal carried on the third frequency domain resource is associated with a DMRS port corresponding to a demodulation reference signal DMRS carried on the first frequency domain resource, and/or a target reference signal port corresponding to the target reference signal carried on the fourth frequency domain resource is associated with a DMRS port corresponding to a DMRS carried on the second frequency domain resource.

Optionally, the first frequency domain resource and the second frequency domain resource are used to carry a PDSCH or a PUSCH.

Optionally, when the first frequency domain resource and the second frequency domain resource are used to carry the PUSCH, the QCL assumption includes only a type D.

In this embodiment of this application, for an optional value of $M_{RB}$ and a manner of mapping the target reference signal, refer to related content in the first aspect. Details are not described herein again.

According to a sixth aspect, this application further provides a reference signal transmission method. The reference signal transmission method corresponds to the method in the fourth aspect, and is described from a perspective of a transmit end. The reference signal transmission method includes: The transmit end determines a time domain density L of a target reference signal based on modulation and coding scheme MCS information; maps the target reference signal once starting from a reference time domain resource block in a first time domain resource at an interval of L time domain resource blocks, to obtain a third time domain resource that carries the target reference signal; and/or maps the target reference signal once starting from a reference time domain resource block in a second time domain resource at an interval of L time domain resource blocks, to obtain a fourth time domain resource that carries the target reference signal; and sends, by using a first QCL assumption, the target reference signal carried on the third time domain resource, and/or sends, by using a second QCL assumption, the target reference signal carried on the fourth time domain resource.

The MCS information is used to indicate a modulation and coding scheme of scheduled time domain resources. The scheduled time domain resources include the first time domain resource and the second time domain resource. The first time domain resource is associated with the first QCL assumption, and the second time domain resource is associated with the second QCL assumption.

A target reference signal port corresponding to the target reference signal carried on the third time domain resource is associated with a DMRS port corresponding to a demodulation reference signal DMRS carried on the first time domain resource; and/or a target reference signal port corresponding to the target reference signal carried on the fourth time domain resource is associated with a DMRS port corresponding to a demodulation reference signal DMRS carried on the second time domain resource.

Optionally, the first frequency domain resource and the second frequency domain resource are used to carry a PDSCH or a PUSCH.

Optionally, when the first frequency domain resource and the second frequency domain resource are used to carry the PUSCH, the QCL assumption includes only a type D.

For other content of this aspect, refer to the content described in the fourth aspect. Details are not described herein again.

According to a seventh aspect, an embodiment of this application further provides a communication apparatus. The communication apparatus may be a terminal device, an apparatus in the terminal device, or an apparatus that can be used together with the terminal device. The communication apparatus has some or all functions of the receive end in the method examples in the first aspect to the fourth aspect. For example, functions of the communication apparatus may be functions in some or all of embodiments of this application, or may be a function of independently implementing any embodiment of this application. The function may be implemented by hardware, or may be implemented by hardware executing corresponding software. The hardware or the software includes one or more units or modules corresponding to the foregoing function.

In a possible design, a structure of the communication apparatus may include a processing unit and a transceiver unit. The processing unit is configured to support the communication apparatus in performing a corresponding function in the method provided in any one of the first aspect to the fourth aspect. The transceiver unit is configured to support communication between the communication apparatus and another device. The another device may be a terminal device. The communication apparatus may further include a storage unit. The storage unit is configured to be coupled to the processing unit and the transceiver unit, and stores program instructions and data that are necessary for the communication apparatus.

In an implementation, the communication apparatus includes a transceiver unit and a processing unit.

The processing unit is configured to determine a frequency domain density K of a target reference signal based on a quantity $M_{RB}$ of frequency domain resources.

The processing unit is configured to determine, based on the frequency domain density K, a third frequency domain resource that carries the target reference signal in a first frequency domain resource, and/or a fourth frequency domain resource that carries the target reference signal in a second frequency domain resource.

The quantity $M_{RB}$ of frequency domain resources is greater than zero and less than $N_{RB}$, $N_{RB}$ is a quantity of scheduled frequency domain resources, and the scheduled frequency domain resources include the first frequency domain resource and the second frequency domain resource.

The first frequency domain resource is associated with a first quasi co-location QCL assumption, and the second frequency domain resource is associated with a second QCL assumption.

The transceiver unit is configured to: receive, by using the first quasi co-location QCL assumption, the target reference signal carried on the third frequency domain resource, and/or receive, by using the second quasi co-location QCL assumption, the target reference signal carried on the fourth frequency domain resource.

In another implementation, the communication apparatus includes a transceiver unit and a processing unit.

The processing unit is configured to determine a time domain density L of a target reference signal based on modulation and coding scheme MCS information.

The processing unit is configured to: map the target reference signal once starting from a reference time domain resource block in a first time domain resource at an interval of L time domain resource blocks, to obtain a third time domain resource that carries the target reference signal; and/or map the target reference signal once starting from a reference time domain resource block in a second time domain resource at an interval of L time domain resource blocks, to obtain a fourth time domain resource that carries the target reference signal.

The transceiver unit is configured to: receive, by using a first QCL assumption, the target reference signal carried on the third time domain resource, and/or receive, by using a second QCL assumption, the target reference signal carried on the fourth time domain resource.

The MCS information is used to indicate a modulation and coding scheme of scheduled time domain resources. The scheduled time domain resources include the first time domain resource and the second time domain resource. The first time domain resource is associated with the first QCL assumption, and the second time domain resource is associated with the second QCL assumption.

For example, the processing unit may be a processor, the transceiver unit may be a transceiver or a communication interface, and the storage unit may be a memory.

In an implementation, the communication apparatus includes a communication interface and a processor.

The processor is configured to determine a frequency domain density K of a target reference signal based on a quantity $M_{RB}$ of frequency domain resources.

The processor is configured to determine, based on the frequency domain density K, a third frequency domain resource that carries the target reference signal in a first frequency domain resource, and/or a fourth frequency domain resource that carries the target reference signal in a second frequency domain resource.

The quantity $M_{RB}$ of frequency domain resources is greater than zero and less than $N_{RB}$, $N_{RB}$ is a quantity of scheduled frequency domain resources, and the scheduled frequency domain resources include the first frequency domain resource and the second frequency domain resource.

The first frequency domain resource is associated with a first quasi co-location QCL assumption, and the second frequency domain resource is associated with a second QCL assumption.

The communication interface is configured to: receive, by using the first quasi co-location QCL assumption, the target reference signal carried on the third frequency domain resource, and/or receive, by using the second quasi co-location QCL assumption, the target reference signal carried on the fourth frequency domain resource.

In another implementation, the communication apparatus includes a communication interface and a processor.

The processor is configured to determine a time domain density L of a target reference signal based on modulation and coding scheme MCS information.

The processor is configured to: map the target reference signal once starting from a reference time domain resource block in a first time domain resource at an interval of L time domain resource blocks, to obtain a third time domain resource that carries the target reference signal; and/or map the target reference signal once starting from a reference time domain resource block in a second time domain resource at an interval of L time domain resource blocks, to obtain a fourth time domain resource that carries the target reference signal.

The communication interface is configured to: receive, by using a first QCL assumption, the target reference signal carried on the third time domain resource, and/or receive, by using a second QCL assumption, the target reference signal carried on the fourth time domain resource.

The MCS information is used to indicate a modulation and coding scheme of scheduled time domain resources. The scheduled time domain resources include the first time domain resource and the second time domain resource. The first time domain resource is associated with the first QCL assumption, and the second time domain resource is associated with the second QCL assumption.

According to an eighth aspect, an embodiment of this application further provides a communication apparatus. The communication apparatus may be a network device, an apparatus in the network device, or may be an apparatus that can be used together with the network device. The communication apparatus has some or all functions of the transmit end in the method examples in the fifth aspect and the sixth aspect. For example, functions of the communication apparatus may be functions in some or all of embodiments of this application, or may be a function of independently implementing any embodiment of this application. The function may be implemented by hardware, or may be implemented by hardware executing corresponding software. The hardware or the software includes one or more units or modules corresponding to the foregoing function.

In a possible design, a structure of the communication apparatus may include a processing unit and a transceiver unit. The processing unit is configured to support the communication apparatus in performing a corresponding function in the method provided in any one of the fifth aspect and the sixth aspect. The transceiver unit is configured to support communication between the communication apparatus and another device. The another device may be a terminal device. The communication apparatus may further include a storage unit. The storage unit is configured to be coupled to the processing unit and the transceiver unit, and stores program instructions and data that are necessary for the communication apparatus.

In an implementation, the communication apparatus includes a transceiver unit and a processing unit.

The processing unit is configured to determine a frequency domain density K of a target reference signal based on a quantity $M_{RB}$ of frequency domain resources.

The processing unit is configured to determine, based on the frequency domain density K, a third frequency domain resource that carries the target reference signal in a first frequency domain resource, and/or a fourth frequency domain resource that carries the target reference signal in a second frequency domain resource.

The quantity $M_{RB}$ of frequency domain resources is greater than zero and less than $N_{RB}$, $N_{RB}$ is a quantity of scheduled frequency domain resources, and the scheduled frequency domain resources include the first frequency domain resource and the second frequency domain resource.

The first frequency domain resource is associated with a first quasi co-location QCL assumption, and the second frequency domain resource is associated with a second QCL assumption.

The transceiver unit is configured to: send, by using the first quasi co-location QCL assumption, the target reference signal carried on the third frequency domain resource, and/or send, by using the second quasi co-location QCL assumption, the target reference signal carried on the fourth frequency domain resource.

In another implementation, the communication apparatus includes a transceiver unit and a processing unit.

The processing unit is configured to determine a time domain density L of a target reference signal based on modulation and coding scheme MCS information.

The processing unit is configured to: map the target reference signal once starting from a reference time domain resource block in a first time domain resource at an interval of L time domain resource blocks, to obtain a third time domain resource that carries the target reference signal; and/or map the target reference signal once starting from a reference time domain resource block in a second time domain resource at an interval of L time domain resource blocks, to obtain a fourth time domain resource that carries the target reference signal.

The transceiver unit is configured to: send, by using a first QCL assumption, the target reference signal carried on the third time domain resource, and/or send, by using a second QCL assumption, the target reference signal carried on the fourth time domain resource.

The MCS information is used to indicate a modulation and coding scheme of scheduled time domain resources. The scheduled time domain resources include the first time domain resource and the second time domain resource. The first time domain resource is associated with the first QCL assumption, and the second time domain resource is associated with the second QCL assumption.

For example, the processing unit may be a processor, the transceiver unit be a transceiver, and the storage unit may be a memory.

In an implementation, the communication apparatus includes a transceiver and a processor.

The processor is configured to determine a frequency domain density K of a target reference signal based on a quantity $M_{RB}$ of frequency domain resources.

The processor is configured to determine, based on the frequency domain density K, a third frequency domain resource that carries the target reference signal in a first frequency domain resource, and/or a fourth frequency domain resource that carries the target reference signal in a second frequency domain resource.

The quantity $M_{RB}$ of frequency domain resources is greater than zero and less than $N_{RB}$, $N_{RB}$ is a quantity of scheduled frequency domain resources, and the scheduled frequency domain resources include the first frequency domain resource and the second frequency domain resource.

The first frequency domain resource is associated with a first quasi co-location QCL assumption, and the second frequency domain resource is associated with a second QCL assumption.

The transceiver is configured to: send, by using the first quasi co-location QCL assumption, the target reference signal carried on the third frequency domain resource, and/or send, by using the second quasi co-location QCL assumption, the target reference signal carried on the fourth frequency domain resource.

In another implementation, the communication apparatus includes a transceiver and a processor.

The processor is configured to determine a time domain density L of a target reference signal based on modulation and coding scheme MCS information.

The processor is configured to: map the target reference signal once starting from a reference time domain resource block in a first time domain resource at an interval of L time domain resource blocks, to obtain a third time domain resource that carries the target reference signal; and/or map the target reference signal once starting from a reference time domain resource block in a second time domain resource at an interval of L time domain resource blocks, to obtain a fourth time domain resource that carries the target reference signal.

The transceiver is configured to: send, by using a first QCL assumption, the target reference signal carried on the third time domain resource, and/or receive, by using a second QCL assumption, the target reference signal carried on the fourth time domain resource.

The MCS information is used to indicate a modulation and coding scheme of scheduled time domain resources. The scheduled time domain resources include the first time domain resource and the second time domain resource. The first time domain resource is associated with the first QCL assumption, and the second time domain resource is associated with the second QCL assumption.

In a specific implementation process, the processor may be configured to perform, for example, but not limited to, baseband related processing, and the transceiver may be configured to perform, for example, but not limited to, radio frequency receiving and sending. The foregoing components may be separately disposed on chips independent of each other, or at least some or all of the components may be disposed on one chip. For example, the processor may be further classified into an analog baseband processor and a digital baseband processor. The analog baseband processor and the transceiver may be integrated on a same chip, and the digital baseband processor may be disposed on an independent chip. With continuous development of integrated circuit technologies, more components can be integrated on a same chip. For example, the digital baseband processor and a plurality of application processors (for example, but not limited to, a graphics processor and a multimedia processor) may be integrated on a same chip. Such a chip may be referred to as a system on chip (system on chip). Whether all the components are separately disposed on different chips or integrated and disposed on one or more chips usually depends on a specific requirement for a product design. Specific implementations of the foregoing components are not limited in this embodiment of this application.

According to a ninth aspect, an embodiment of this application provides a processor, configured to perform a process of sending the foregoing information and receiving the foregoing information in a process of the methods provided in the first aspect to the sixth aspect. It may be understood as a process of outputting the foregoing information by the processor and a process of receiving the foregoing input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, when the processor receives the input information, the transceiver receives the information and the information is input into the processor. Still further, after the transceiver receives the information, other processing may need to be performed on the information before the information is input into the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In a specific implementation process, the processor may be a processor specially configured to perform these methods, or a processor, for example, a general-purpose processor, that executes computer instructions in a memory to perform these methods. The memory may be a non-transitory memory, for example, a read-only memory (ROM), and the memory and the processor may be integrated on a same chip, or may be separately disposed on different chips. A type of the memory and a manner of disposing the memory and the processor are not limited in this embodiment of this application.

According to a tenth aspect, an embodiment of this application further provides a chip system. The chip system includes a processor and an interface. The chip system may be deployed in a network device.

In a possible design, the interface is configured to: send first indication information to a second network device, where the first indication information is used to request capability information of a terminal device; and receive first capability information from the second network device, where the first capability information includes the capability information of the terminal device. The processor is configured to determine the first indication information.

In a possible design, the interface is configured to: receive first indication information from a first network device, where the first indication information is used to request capability information of a terminal device; and send first capability information to the first network device, where the first capability information includes the capability information of the terminal device. The processor is configured to determine the first capability information based on the first indication information.

In a possible design, the chip system further includes a memory. The memory is configured to store program instructions and data that are necessary for the terminal device. The chip system may include a chip, or may include a chip and another discrete component.

According to an eleventh aspect, an embodiment of this application provides a computer-readable storage medium, configured to store computer software instructions used by the foregoing receive end. The computer software instructions include a program used to perform the method in any one of the first aspect to the fourth aspect.

According to a twelfth aspect, an embodiment of this application provides a computer-readable storage medium, configured to store computer software instructions used by the foregoing receive end. The computer software instructions include a program used to perform the method in any one of the fifth aspect and the sixth aspect.

According to a thirteenth aspect, an embodiment of this application provides a computer program product including instructions. When the computer program product runs on a computer, the computer is enabled to perform the method in any one of the first aspect to the fourth aspect.

According to a fourteenth aspect, an embodiment of this application provides a computer program product including instructions. When the computer program product runs on a computer, the computer is enabled to perform the method in any one of the fifth aspect and the sixth aspect.

According to a fifteenth aspect, an embodiment of this application provides a system. The system includes at least two transmit ends and at least one receive end. A first transmit end determines a frequency domain density K of a target reference signal based on a quantity $M_{RB}$ of frequency domain resources; and determines, based on the frequency domain density K, a third frequency domain resource that carries the target reference signal in a first frequency domain resource, and sends, by using a first quasi co-location QCL assumption, the target reference signal carried on the third frequency domain resource. A second transmit end determines, based on the frequency domain density K, a fourth frequency domain resource that carries the target reference signal in a second frequency domain resource, and sends, by using a second quasi co-location QCL assumption, the target reference signal carried on the fourth frequency domain resource.

The receive end determines the frequency domain density K of the target reference signal based on the quantity $M_{RB}$ of frequency domain resources; determines, based on the frequency domain density K, the third frequency domain resource that carries the target reference signal in the first frequency domain resource, and the fourth frequency domain resource that carries the target reference signal in the second frequency domain resource; and receives, by using the first quasi co-location QCL assumption, the target reference signal carried on the third frequency domain resource, and receives, by using the second quasi co-location QCL assumption, the target reference signal carried on the fourth frequency domain resource.

The quantity $M_{RB}$ of frequency domain resources is greater than zero and less than $N_{RB}$, $N_{RB}$ is a quantity of scheduled frequency domain resources, and the scheduled frequency domain resources include the first frequency domain resource and the second frequency domain resource.

The first frequency domain resource is associated with the first quasi co-location QCL assumption, and the second frequency domain resource is associated with the second QCL assumption.

Optionally, in the system, when the target reference signal has one QCL assumption, one of the first transmit end and the second transmit end may perform the foregoing steps, and the corresponding receive end correspondingly performs a related operation. For another optional implementation, refer to the related content in the first aspect to the sixth aspect. Details are not described herein again.

DESCRIPTION OF EMBODIMENTS

The following describes technical solutions in this application with reference to the accompanying drawings.

The technical solutions in this application can be specifically applied to various communication systems. For example, with continuous development of communication technologies, the technical solutions in this application may be further applied to a future network, such as a 5G system or a 6G system, which may also be referred to as a new radio (NR) system, and may also be applied to a device-to-device (D2D) system, a machine-to-machine (M2M) system, and the like.

Figure 1:
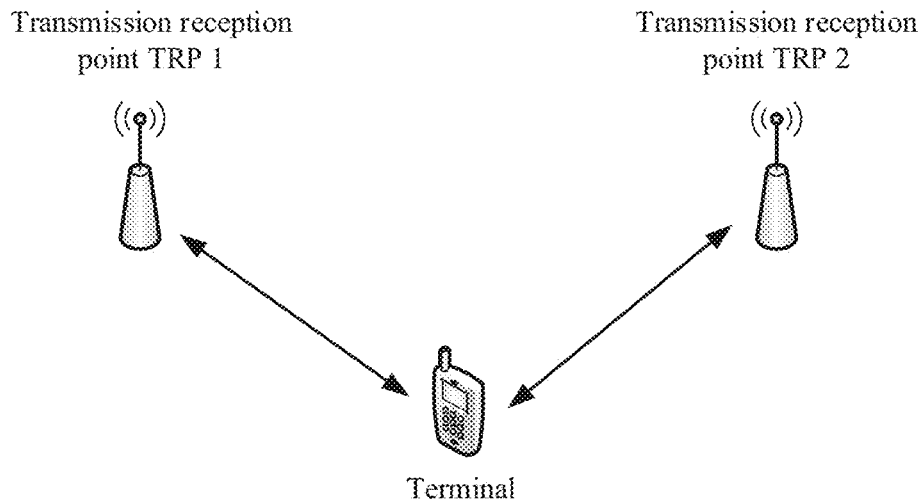
FIG. 1 is a schematic diagram of a structure of a communication system according to an embodiment of this application.

FIG. 1 is a schematic diagram of an architecture of a communication system according to an embodiment of this application. The communication system may include but is not limited to one network device and one terminal device. A quantity and forms of devices shown in FIG. 1 are used as an example and do not constitute a limitation on this embodiment of this application. During actual application, two or more network devices and two or more terminal devices may be included. The communication system shown in FIG. 1 is described by using an example in which there are two network devices and the two network devices can serve a same terminal device. In FIG. 1, a transmission reception point TRP is used as an example of the network device, and a mobile phone is used as an example of the terminal device.

In this application, the network device may be a device that has a wireless transceiver function or a chip that can be disposed in the device. The network device includes but is not limited to an evolved NodeB (eNB), a radio network controller (RNC), a NodeB (NB), a network device controller (base station controller, BSC), a network device transceiver station (base transceiver station, BTS), a home network device (for example, a home evolved NodeB, or a home NodeB, HNB), a baseband unit (BBU), an access point (AP) in a wireless fidelity (WI-FI) system, a wireless relay node, a wireless backhaul node, a transmission point (transmission and reception point (TRP) or transmission point (TP)), and the like; or may be a device used in a 5G system, a 6G system, or even a 7G system, for example, a gNB or a transmission point (TRP or TP) in an NR system, or one or a group of antenna panels (including a plurality of antenna panels) of a network device in the 5G system; or may be a network node that constitutes a gNB or a transmission point, for example, a baseband unit (BBU), a distributed unit (DU), a pico network device (Picocell), a femto network device (Femtocell), or a road side unit (RSU) in vehicle to everything (V2X) or in an intelligent driving scenario.

In some deployments, the gNB or the transmission point may include a centralized unit (CU), a distributed unit (DU), and the like. The gNB or the transmission point may further include a radio unit (RU). The CU implements some functions of the gNB or the transmission point, and the DU implements some functions of the gNB or the transmission point. For example, the CU implements functions of radio resource control (RRC) and packet data convergence protocol (PDCP) layers, and the DU implements functions of radio link control (RLC), media access control (MAC), and physical (PHY) layers. Information at the RRC layer finally becomes information at the physical layer or is transformed from information at the physical layer. Therefore, in such an architecture, it may be considered that higher layer signaling such as RRC layer signaling or PHCP layer signaling is sent by the DU or is sent by the DU and the RU. It can be understood that the network device may be a CU node, a DU node, or a device including the CU node and the DU node. In addition, the CU may be classified as a network device in an access network RAN, or the CU may be classified as a network device in a core network (CN). This is not limited herein.

In this application, the terminal device may also be referred to as user equipment (UE), an access terminal, a user unit, a user station, a mobile station, a remote station, a remote terminal, a mobile device, a user terminal, a user agent, or a user apparatus, and may be used in 5G, 6G, and even 7G systems. The terminal device in embodiments of this application may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a wireless terminal in V2X vehicle to everything, an RSU of a wireless terminal type, or the like.

For ease of understanding embodiments disclosed in this application, the following descriptions are provided.

(1) In embodiments disclosed in this application, an NR network scenario in a wireless communication network is used to describe some scenarios. It should be noted that the solutions in embodiments disclosed in this application may be further applied to another wireless communication network, and a corresponding name may also be replaced with a name of a corresponding function in the another wireless communication network.

(2) Embodiments disclosed in this application present aspects, embodiments, or features of this application around a system including a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

(3) In embodiments disclosed in this application, the term "example" is used to represent an example, illustration, or illustration. Any embodiment or design scheme described as an "example" in this application should not be explained as being more preferred or having more advantages than another embodiment or design scheme. Exactly, the term "example" is used to present a concept in a specific manner.

(4) In embodiments disclosed in this application, "of", "relevant", and "corresponding" may sometimes be interchangeably used. It should be noted that expressed meanings are consistent when differences are not emphasized.

(5) "At least one" in embodiments disclosed in this application may alternatively be described as one or more, and "a plurality of" means two, three, four, or more. This is not limited in this application. In embodiments disclosed in this application, "first", "second", and the like are used for distinguishing between technical features described by "first", "second", and the like. There is no chronological order or no size order between the technical features described by "first" and "second".

To facilitate understanding of embodiments disclosed in this application, some concepts in embodiments of this application are first described. These concepts include but are not limited to the following.

First: Concept Descriptions

1. Frequency Domain Resource Block and Time Domain Resource Block

A resource in a communication system is divided into a plurality of symbols in terms of time, for example, a plurality of orthogonal frequency division multiplexing (OFDM) symbols. The time domain resource block may be referred to as a time unit. For example, the time domain resource block may be one or more radio frames, one or more subframes, one or more slots, one or more mini-slots, one or more orthogonal frequency division multiplexing (OFDM) symbols, a discrete Fourier transform spread orthogonal frequency division multiplexing (DFT-s-OFDM) symbol, or a time window formed by a plurality of frames or subframes, for example, a system information (SI) window.

A resource in the communication system is divided into several subcarriers in terms of frequency. The frequency domain resource block may be referred to as a frequency domain unit. For example, the frequency domain resource block may be one or more resource blocks (RBs) or one or more subcarriers. For example, one RB includes 12 subcarriers. One subcarrier in one RB in frequency domain and one OFDM symbol in time domain form one resource element (RE).

Positions, a quantity, and the like of scheduled frequency domain resources may be indicated by a frequency domain resource allocation (FDRA) field. For example, in a specific indication manner, an entire system bandwidth or a bandwidth part BWP is divided at a granularity of RB groups in a bitmap manner for the field, and each resource set at the granularity of RB groups corresponds to one bit in a bitmap, where a bit in the bitmap is set to 0, indicating that a corresponding RB group is not scheduled, and a bit in the bitmap is set to 1, indicating that a corresponding RB group is scheduled. A size of the RB group may be one or more RBs. For another example, the FDRA field may further indicate a frequency domain start position and a frequency domain size that are occupied by scheduled data.

Positions, a quantity, and the like of scheduled time domain resources may be indicated by a time domain resource allocation (TDRA) field. For example, in a specific indication manner, the field indicates a position of a slot or a subframe occupied by the scheduled data, and may be a relative position based on a DCI detection slot or subframe, or an absolute position based on a slot or a subframe defined by a system.

The scheduled frequency domain resources may be frequency domain resources occupied by a scheduled shared channel. For example, 8 RBs are occupied by scheduling a PDSCH by a base station, that is, the scheduled frequency domain resources are 8 RBs, or a quantity of scheduled frequency domain resources is 8. In this specification, the quantity of scheduled frequency domain resources is equal to a quantity of frequency domain resource blocks included in the scheduled frequency domain resources.

The scheduled time domain resources may be time domain resources occupied by a shared channel. For example, the base station schedules 10 symbols for the PDSCH, that is, the scheduled time domain resources are 10 symbols, or a quantity of scheduled time domain resources is 10. In this specification, the quantity of scheduled time domain resources is equal to a quantity of time domain resource blocks included in the scheduled time domain resources.

The scheduled frequency domain resources and the scheduled time domain resources are indicated by using downlink control information (DCI) or by using RRC signaling.

To adapt to channel changes on different frequency domain resources, a concept of a precoding resource group (PRG) is introduced. RBs in the scheduled frequency domain resources are divided into a plurality of RB groups at a granularity of the PRG, and a quantity of RBs included in each RB group is a value of the PRG. Precoding manners of data, a target reference signal, and the like delivered in an RB group are the same.

For example, a PRG indication is a wideband, all RBs in the scheduled frequency domain resources are divided into one group, and a same precoding manner is used for DMRSs and corresponding data transmitted in different RBs on the scheduled frequency domain resources. For another example, a PRG indication may alternatively be 2 or 4, indicating that one group is obtained at an interval of 2 RBs or 4 RBs, and a same precoding manner is used for data carried in different RBs in an RB group.

2. Target Reference Signal

The target reference signal (target resource signal, target RS) is used to perform channel estimation or used to assist a demodulation reference signal (decoding modulation resource signal, DMRS) in performing channel estimation. Alternatively, the target reference signal is used to estimate a channel-related parameter, for example, phase estimation, phase tracking, or phase estimation. For example, a phase tracking reference signal (PTRS) is used to assist the DMRS in performing channel estimation.

The target reference signal is mapped to a time-frequency resource occupied by a shared channel. When the shared channel is scheduled, the target reference signal is simultaneously scheduled.

The target reference signal is mapped to a time domain resource occupied by the shared channel based on a time domain density L and a reference time domain resource block. For example, the time domain resource that carries the PTRS is one or more time domain resource blocks that are obtained by mapping the PTRS once at an interval of L time domain resource blocks starting from the reference time domain resource block in the time domain resources occupied by the shared channel. A first understanding of mapping the PTRS once at an interval of L time domain resource blocks is that the reference time domain resource block is used as a start position, and time domain resource blocks that carry the PTRS are obtained at the interval of L time domain resource blocks until the last time domain resource block occupied by the shared channel. A second understanding of mapping the PTRS once at an interval of L time domain resource blocks is that the reference time domain resource block is used as a start position, and time domain resource blocks that carry the PTRS are obtained at an interval of L time domain resource blocks until the last time domain resource block occupied by the shared channel.

Figure 2:
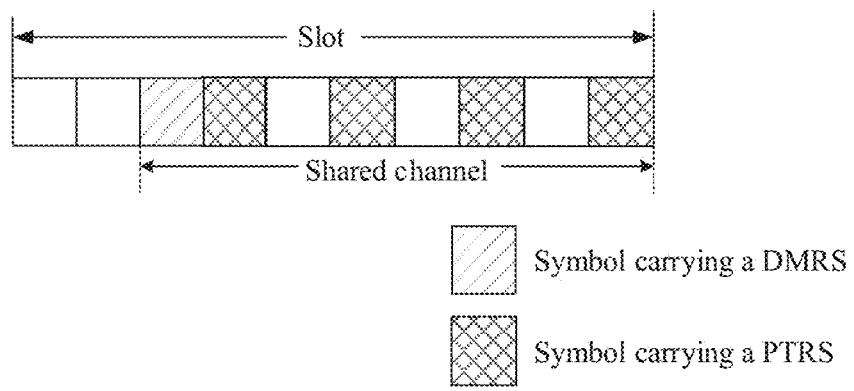
FIG. 2 is a schematic diagram of carrying a PTRS in a scheduled time domain resource according to an embodiment of this application.

For example, as shown in FIG. 2, it is assumed that a time domain resource occupied by a shared channel is 8 symbols from the $3^{rd}$ symbol to the $10^{th}$ symbol in a slot. A reference time domain resource block and a time domain resource block are in a unit of one symbol. Because a DMRS occupies the first N symbols of the time domain resource, for example, N is equal to 1 or 2, that is, the $3^{rd}$ symbol or the $4^{th}$ symbol in the slot, a PTRS may occupy an $(N+1)^{th}$ symbol and the following symbols of the time domain resource, that is, the $4^{th}$ symbol or the $5^{th}$ symbol in the slot and the following symbols. It is assumed that the DMRS occupies the $3^{rd}$ symbol in the slot, the reference time domain resource block is the $4^{th}$ symbol in the slot, and the time domain density L is equal to 2. According to the foregoing first understanding, the time domain resource to which the PTRS is mapped is as follows: Starting from the $4^{th}$ symbol in the slot, that is, $i_0=4$, L time domain resource blocks are spaced between two adjacent time domain resources used to carry the PTRS, that is, the reference time domain resource block carries the PTRS, and a time domain position to which the PTRS is mapped other than the reference time domain resource block is $i_0+Lxi+1$, where $i_0$ is a position of the reference time domain resource block, L is the time domain density, and i may be 1, 2, . . . , so that obtained symbols carrying the PTRS are respectively the $4^{th}$ symbol, the $7^{th}$ symbol, and the $9^{th}$ symbol in the slot. According to the second understanding, to be specific, an offset of a time domain position to which the PTRS is mapped relative to the reference time domain resource block is Lxi, that is, the time domain position to which the PTRS is mapped is $i_0+Lxi$, where i may be 0, 1, 2, . . . , and the time domain resource to which the PTRS is mapped is as follows: Starting from the $4^{th}$ symbol in the slot, the PTRS is mapped once at an interval of two symbols, and obtained symbols carrying the PTRS are respectively the $4^{th}$ symbol, the $6^{th}$ symbol, the $8^{th}$ symbol, and the $10^{th}$ symbol in the slot.

A frequency domain resource occupied by the target reference signal in a frequency domain resource occupied by the shared channel may be determined based on a frequency domain density K and a reference frequency domain resource block. For example, the frequency domain resource that carries the PTRS is one or more frequency domain resource blocks that are obtained by mapping the PTRS once at an interval of K frequency domain resource blocks starting from the reference frequency domain resource block in the frequency domain resource occupied by the shared channel.

A first understanding of "mapping the PTRS once at an interval of K frequency domain resource blocks" is that the reference frequency domain resource block is used as a start position, and frequency domain resource blocks that carry the PTRS are obtained at the interval of K frequency domain resource blocks until the last frequency domain resource block occupied by the shared channel. To be specific, starting from the reference frequency domain resource block, K frequency domain resource blocks are spaced between two adjacent frequency domain resources used to carry the PTRS, that is, the reference frequency domain resource block carries the PTRS, and a frequency domain position to which the PTRS is mapped other than the reference frequency domain resource block is $j_0+K*j+1$, where $j_0$ is a position of the reference frequency domain resource block, K is the frequency domain density, and j may be 1, 2, . . . .

For example, the frequency domain resource block that carries the PTRS is one or more frequency domain resource blocks that are obtained by mapping the PTRS once at an interval of K frequency domain resource blocks starting from the reference frequency domain resource block in the frequency domain resource occupied by the shared channel, that is, the reference frequency domain resource block carries the PTRS, and a frequency domain position to which the PTRS is mapped other than the reference frequency domain resource block is $j_0+K*j+1$, where j is a position of the reference frequency domain resource block, K is the frequency domain density, and j may be 1, 2, . . . . For example, it is assumed that the frequency domain resource occupied by the shared channel includes $N_{RB}$ RBs, where $N_{RB}=8$, the frequency domain density is equal to 4, and the reference frequency domain resource block is the $1^{st}$ RB in the frequency domain resource occupied by the shared channel. In this case, the frequency domain resource that carries the PTRS is the $1^{st}$ RB and the $6^{th}$ RB in the frequency domain resource occupied by the shared channel.

Figure 3:
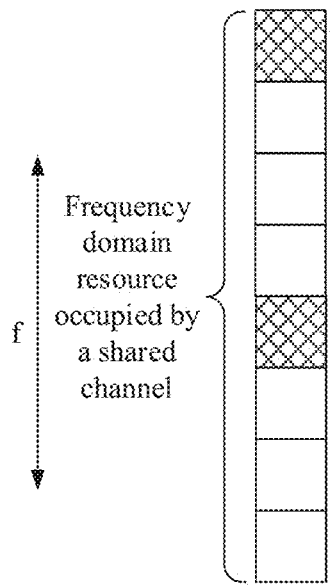
FIG. 3 is a schematic diagram of carrying a PTRS in a scheduled frequency domain resource according to an embodiment of this application.

A second understanding of "mapping the PTRS once at an interval of K frequency domain resource blocks" is that the reference frequency domain resource block is used as a start position, and frequency domain resource blocks that carry the PTRS are obtained at an interval of K frequency domain resource blocks until the last frequency domain resource block occupied by the shared channel. To be specific, an offset of a frequency domain position to which the PTRS is mapped relative to the reference frequency domain resource block is $K*j$, where j may be 0, 1, 2, . . . . For example, it is assumed that the frequency domain resource occupied by the shared channel includes NRB RBs, where NRB=8, the frequency domain density is equal to 4, and the reference frequency domain resource block is the 1st RB in the frequency domain resource occupied by the shared channel. In this case, the frequency domain resource that carries the PTRS is the 1st RB and the 5th RB in the frequency domain resource occupied by the shared channel, as shown in FIG. 3.

Further, a subcarrier occupied by the PTRS may be determined from the frequency domain resource block that carries the PTRS. For example, the frequency domain resource block is one RB. The PTRS occupies one subcarrier in one RB, and a position of the subcarrier is determined based on an index number (DMRS port number for short) of a DMRS port associated with the PTRS and a subcarrier position offset. As shown in Table 1, $k_{ref}^{RE}$ indicates an offset between a subcarrier occupied by a PTRS and a start subcarrier in an RB, and is referred to as a resource element offset or a subcarrier position offset for short. For example, assuming that the PTRS is associated with a DMRS port number "1000", and a DMRS configuration type is 1, the subcarrier occupied by the PTRS is one subcarrier in subcarrier index numbers 0, 2, 6, and 8 in the frequency domain resource blocks that carry the PTRS.

TABLE 1

| | PTRS subcarrier position offset | | | | | | | |
|---|---|---|---|---|---|---|---|---|
| | $k_{ref}^{RE}$ | | | | | | | |
| DMRS port (DM-RS antenna port) $^p$ | DMRS configuration type 1 resourceElementOffset | | | | DM-RS configuration type 2 resourceElementOffset | | | |
| | 00 | 01 | 10 | 11 | 00 | 01 | 10 | 11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

3. Quasi Co-Location (QCL) Assumption

A terminal device needs to perform channel estimation based on a DMRS, a PTRS, and the like, and receive corresponding data by using a channel estimation result, thereby improving data receiving performance.

Large-scale parameters of some channels may be used to assist in receiving signals such as the DMRS and the PTRS, and may also be used to assist in receiving data. The QCL assumption is used to indicate the large-scale parameters. The QCL assumption includes one or more of the following parameters: an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, terminal transmit beamforming, terminal receive beamforming, spatial channel correlation, base station transmit beamforming, base station receive beamforming, an average channel gain, an average channel delay, delay spread, Doppler spread, a Doppler shift, spatial receive parameters, and the like.

The QCL assumption includes one or more of the following types of large-scale parameters:
  QCL assumption type (QCL types) A: Doppler shift, Doppler spread, average delay, and delay spread;
  QCL types B: Doppler shift and Doppler spread;
  QCL types C: average delay and Doppler shift; and
  QCL types D: spatial Rx parameter.

A QCL assumption indication manner is as follows: A to-be-received reference signal is associated with a reference signal (reference RS), so that a large-scale parameter obtained by using the reference signal may be used to process the to-be-received RS. For example, the to-be-received reference signal may be a DMRS, and the DMRS may be associated with a measurement reference signal to indicate that the two signals have a QCL type A and type D association relationship. Therefore, information about the QCL type A and the type D may be obtained by using the measurement reference signal, and is used to assist in receiving the DMRS. For another example, the to-be-received reference signal may be a DMRS, and the DMRS may be associated with a PTRS to indicate that the two signals have a QCL type A and type D association relationship. Therefore, information about the QCL type A and the type D may be obtained by receiving the DMRS, and is used to assist in receiving the PTRS. For another example, the to-be-received reference signal may be a DMRS, and the DMRS may be associated with a PTRS to indicate that the two signals have a QCL type B association relationship. Therefore, information about the QCL type B may be obtained by using the DMRS, to assist in receiving the PTRS. For another example, the to-be-received reference signal may be a DMRS, and the DMRS may be associated with a PTRS to indicate that the two signals have a QCL type B association relationship. Therefore, information about the QCL type B may be obtained by using the PTRS, to assist in receiving the DMRS.

DCI includes a transmission configuration indication (TCI) field, and the TCI field indicates a QCL assumption used for a DMRS carried on scheduled time-frequency resources. Because a QCL assumption used when data carried on the scheduled time-frequency resources is received is the same as the QCL assumption used for the carried DMRS, the TCI field may also be referred to as a QCL assumption associated with the scheduled time-frequency resources. That is, a time-frequency resource is associated with a QCL assumption, which may indicate that data and a DMRS that are carried on the time-frequency resource are received by using the QCL assumption.

In addition, a target reference signal other than the DMRS is used to assist the DMRS in performing channel estimation. For example, a phase estimation result of the PTRS may be used to adjust some parameters in the QCL assumption used for the DMRS carried on the time-frequency resource. Therefore, the PTRS is associated with the DMRS. In one understanding, an estimation result of the PTRS may be used to adjust some large-scale parameters in the QCL assumption used for the DMRS, for example, QCL types B, and the PTRS may be received by using the QCL assumption used for the DMRS. For example, the PTRS is received by using QCL types A and QCL types D in the QCL assumption. In the other understanding, large-scale parameters used for receiving the PTRS, for example, the QCL type A, type B, and type D, are obtained from receiving of the DMRS.

The time-frequency resource described in this specification may be a time domain resource, a frequency domain resource, or a time domain resource and a frequency domain resource. Therefore, in this specification, a scenario to which all the three cases are applicable is collectively referred to as a time-frequency resource. For example, the time-frequency resource is associated with the QCL assumption, indicating that the time domain resource is associated with the QCL assumption, the frequency domain resource is associated with the QCL assumption, and the time domain resource and the frequency domain resource are both associated with the QCL assumption.

The association with the QCL assumption described in this specification may also be referred to as association with a TCI state.

4. Multipoint Coordination Transmission Scenario

The multipoint coordination transmission scenario may support a case in which one shared channel (which may also be referred to as one transport block) is sent by a plurality of transmission nodes (for example, a plurality of base stations) in coordination. The plurality of transmission nodes may respectively use different frequency domain resources to transmit the shared channel. That is, a plurality of scheduled frequency domain resource blocks are divided into two groups, and different transmission nodes respectively carry data, target reference signals, and the like delivered by the different transmission nodes. Alternatively, the plurality of transmission nodes may respectively use different time domain resources to transmit the shared channel. That is, a plurality of scheduled time domain resource blocks are divided into two groups, and different transmission nodes respectively carry data, target reference signals, and the like delivered by the different transmission nodes. Alternatively, the plurality of transmission nodes may use different space domain resources to transmit the shared channel. That is, a plurality of transmission ports are scheduled, and different transmission nodes respectively carry data, target reference signals, and the like delivered by the different transmission nodes.

Because transmission paths from each transmission node to a receive end vary greatly, DCI indicates, by using a TCI field, a QCL assumption separately used for a target reference signal (for example, a DMRS) delivered by each transmission node. Because each transmission node uses a different frequency domain resource to transmit the shared channel, the TCI field supports an indication of a plurality of QCL assumptions for receiving data and DMRSs. The plurality of QCL assumptions may respectively correspond to different frequency domain resources, and/or time domain resources, and/or transmission port resources.

The scheduled frequency domain resources may be divided, based on a PRG indication, into frequency domain resources respectively used by different transmission nodes. For example, a TCI state 1 and a TCI state 2 indicated by the TCI field correspond to two QCL assumptions. The scheduled frequency domain resources are divided into a first frequency domain resource and a second frequency domain resource based on the PRG. In this case, the TCI state 1 and the TCI state 2 indicated by the TCI field may be interpreted as: The first frequency domain resource is associated with the TCI state 1 or a QCL assumption 1 indicated by the TCI state 1, and the second frequency domain resource is associated with the TCI state 2 or a QCL assumption 2 indicated by the TCI state 2. That is, for the receive end, when the TCI field indicates two TCI states, it can be learned, based on a predefined correspondence between the two TCI states and the frequency domain resources, that the first frequency domain resource is associated with the TCI state 1 or the QCL assumption 1 indicated by the TCI state 1, and the second frequency domain resource is associated with the TCI state 2 or the QCL assumption 2 indicated by the TCI state 2. In this case, the receive end may receive, based on the QCL assumption 1, a target reference signal, data, and the like that are carried on the first frequency domain resource. The receive end may receive, based on the QCL assumption 2, a target reference signal, data, and the like that are carried on the second frequency domain resource.

In the multipoint coordination transmission scenario, that the scheduled frequency domain resources are divided based on the PRG may include:

When the PRG indication is a wideband, the first (which may also be referred to as the smallest index number) $\lceil N_{RB}/2 \rceil$ RBs in the scheduled frequency domain resources (including a total quantity $N_{RB}$ of RBs) are a frequency domain resource used by one transmission node, that is, the receive end receives, by using the QCL assumption 1, data, a target reference signal, and the like that are carried on the frequency domain resource; and the remaining $\lfloor N_{RB}/2 \rfloor$ RBs in the scheduled frequency domain resources are a frequency domain resource used by the other transmission node, that is, the receive end receives, by using the QCL assumption 2, data, a target reference signal, and the like that are carried on the frequency domain resource.

When the PRG indication is 2 or 4, a frequency domain resource corresponding to a PRG with an even index number is a frequency domain resource used by one transmission node, that is, the receive end receives, by using the QCL assumption 1 or the QCL assumption 2, data, a target reference signal, and the like that are carried on the frequency domain resource; and a frequency domain resource corresponding to a PRG with an odd index number is a frequency domain resource used by the other transmission node, that is, the receive end receives, by using the QCL assumption 2 or the QCL assumption 1, data, a target reference signal, and the like that are carried on the frequency domain resource.

Figure 4:
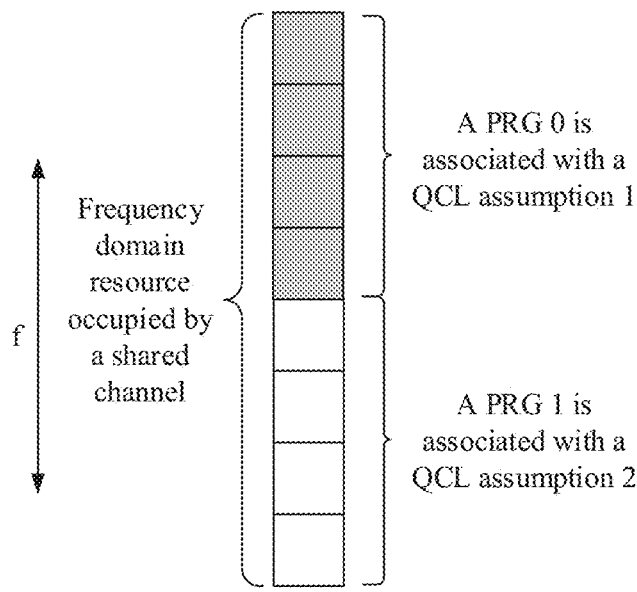
FIG. 4 is a schematic diagram of association between a PRG and a QCL assumption in a scheduled time domain resource according to an embodiment of this application.

For example, as shown in FIG. 4, assuming that a quantity $N_{RB}$ of scheduled frequency domain resources (that is, a quantity of scheduled RBs) is equal to 8, and the PRG indication is a wideband, the first four RBs are one PRG, which is denoted as a PRG 0, and the last four RBs are one PRG, which is denoted as a PRG 1. Assuming that the TCI field indicates two QCL assumptions, which are the QCL assumption 1 and the QCL assumption 2 respectively, a frequency domain resource corresponding to the PRG 0 is associated with the QCL assumption 1, and a frequency domain resource corresponding to the PRG 1 is associated with the QCL assumption 2. It may be simply denoted as that the PRG 0 is associated with the QCL assumption 1, and the PRG 1 is associated with the QCL assumption 2. As shown in FIG. 4, a frequency domain resource indicated by a gray-filled box is associated with the QCL assumption 1, and a frequency domain resource indicated by a white-filled box is associated with the QCL assumption 2. In this specification, the first refers to an RB with the earlier index number in the scheduled frequency domain resources, and correspondingly, the last refers to an RB with the later index number in the scheduled frequency domain resources.

Optionally, the first frequency domain resource and the second frequency domain resource are used to carry a PDSCH or a physical uplink shared channel (PUSCH).

Optionally, when the first frequency domain resource and the second frequency domain resource are used to carry the PUSCH, the QCL assumption includes only a type D.

Second: Reference Signal Transmission Method 1 on a Frequency Domain Resource

As described above, a frequency domain resource occupied by a target reference signal in scheduled frequency domain resources (which may also be referred to as a scheduled bandwidth) or a frequency domain resource that carries the target reference signal may be determined based on a frequency domain density K and a reference frequency domain resource block.

For example, currently, the frequency domain density K of a PTRS is determined based on a quantity $N_{RB}$ of scheduled RBs. The frequency domain density of the PTRS varies with a value of $N_{RB}$. As shown in Table 2, $N_{RB0}$, $N_{RB1}$, and $N_{RB2}$ are preset values (which are values that are configured by a network device side to UE by using RRC signaling based on a value reported by the UE). For example, when $N_{RB}$ is located between $N_{RB0}$ and $N_{RB1}$, the frequency domain density is 2, indicating that one RB in every two RBs may be used to carry the PTRS, or a frequency domain resource determined at an interval of two RBs is used to carry the PTRS. When $N_{RB}$ is greater than $N_{RB1}$, the frequency domain density is 4, indicating that one RB in every four RBs may be used to carry the PTRS, or a frequency domain resource determined at an interval of four RBs is used to carry the PTRS.

One RB in every K RBs may be used to carry the PTRS, and a specific RB in the K RBs that is used to carry the PTRS may be determined based on a reference RB. For example, a ranking of the reference RB in the K RBs with the smallest index number in the scheduled bandwidth is denoted as $k_{ref}^{RB}$. K RBs form one group that is denoted as an $i^{th}$ group, where i=0, 1, 2, . . . , until an RB position determined according to the following formula exceeds an RB position occupied by a PDSCH. In this case, an offset between a position of the RB carrying the PTRS in the $i^{th}$ group and a position of the reference RB is i*K, which may also be determined according to the following formula:

$$k_i^{RB} = i \times K + k_{ref}^{RB} \qquad (1)$$

TABLE 2

| Frequency domain density of a PTRS | |
| --- | --- |
| Scheduled bandwidth | Frequency domain density K |
| $N_{RB} < N_{RB0}$ | There is no PTRS |
| $N_{RB0} \le N_{RB} < N_{RB1}$ | 2 |
| $N_{RB1} \le N_{RB}$ | 4 |

To enable channel parameter (for example, a phase) estimation to be performed on a frequency domain resource associated with each QCL assumption, the frequency domain resource corresponding to each QCL assumption should be associated with a target reference signal port (for example, a PTRS port), which may be understood as that target reference signal ports on frequency domain resources associated with different QCL assumptions are different target reference signal ports, or may be understood as that target reference signal ports on frequency domain resources associated with different QCL assumptions are a same reference signal port, but a QCL assumption corresponding to the target reference signal port on the frequency domain resources associated with different QCL assumptions is determined based on a QCL assumption associated with a frequency domain resource in which the target reference signal is located.

It can be learned from Table 2, a higher scheduled bandwidth indicates a larger frequency domain density K. It can be learned from the foregoing formula (1) that distribution of PTRSs in the scheduled bandwidth is sparser. It is found that if the frequency domain density K is determined based on $N_{RB}$ described above, the distribution of the PTRSs on the frequency domain resource associated with each QCL assumption is very sparse, affecting estimation performance.

Figure 5:
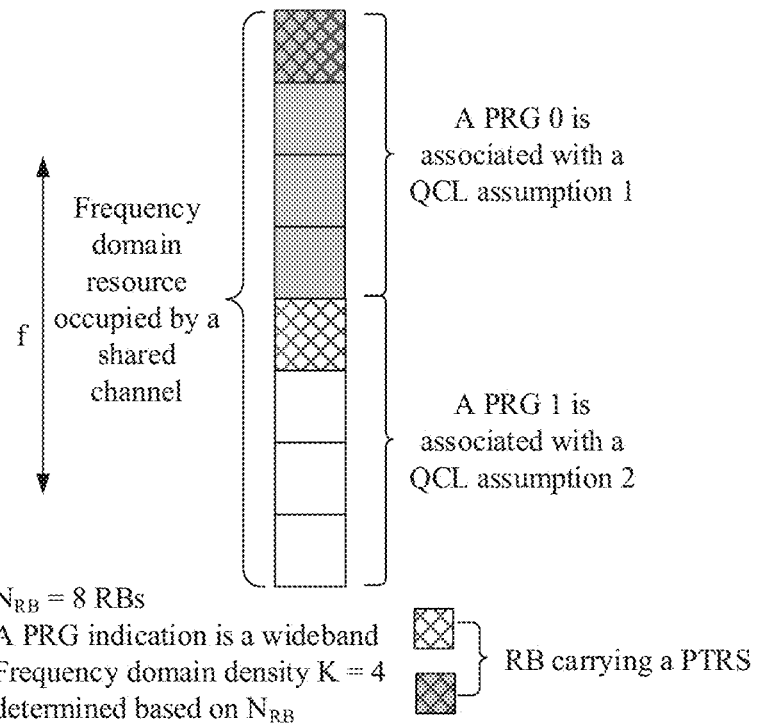
FIG. 5 is a schematic diagram of carrying a PTRS in another scheduled frequency domain resource according to an embodiment of this application.

As shown in FIG. 5, an association relationship between an RB and a QCL assumption shown in FIG. 5 is the same as that in FIG. 4. Assuming that in FIG. 5, the frequency domain density K determined based on $N_{RB}$ equal to 8 is equal to 4, and the reference RB is the $1^{th}$ RB in the four RBs, it may be determined, according to the formula (1), that RBs carrying the PTRSs are the $1^{st}$ RB in the PRG 0 and the $1^{st}$ RB in the PRG 1 respectively. It can be learned that the four RBs associated with each QCL assumption carry only one PTRS, that is, one subcarrier in only one RB carries the PTRS, and may be used for phase estimation.

Figure 6:
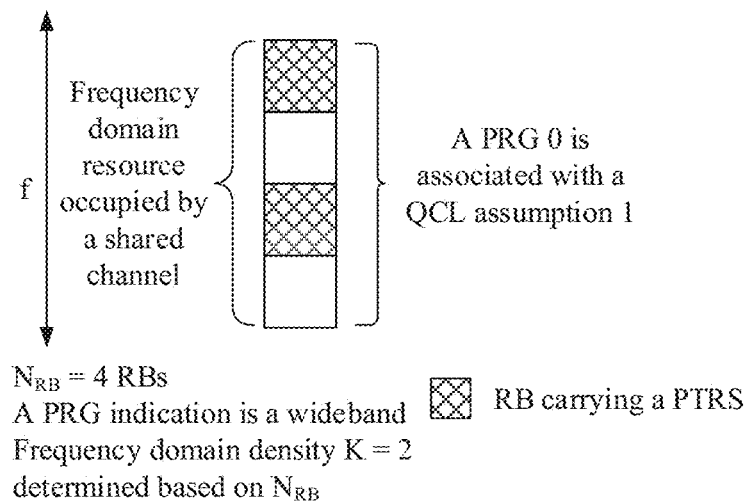
FIG. 6 is a schematic diagram of carrying a PTRS in still another scheduled frequency domain resource according to an embodiment of this application.

However, in a single-station transmission mode, that is, a QCL assumption 1 is indicated, a quantity of frequency domain resources associated with the QCL assumption is equal to 4, that is, $N_{RB}$ is equal to 4, and the determined frequency domain density K may be equal to 2 (where smaller $N_{RB}$ indicates a smaller frequency domain density K). As shown in FIG. 6, each RB carries one PTRS, which is equivalent to a fact that the four RBs all carry the PTRSs. It can be learned, by comparing FIG. 5 and FIG. 6, that in the multipoint coordination transmission scenario, if a current reference signal transmission method is still used, PTRSs carried on frequency domain resources associated with the QCL assumption are very sparse, affecting phase estimation performance.

To resolve the problem, this application provides a reference signal transmission method. A value close to a quantity of frequency domain resources corresponding to each QCL assumption may be used to determine a frequency domain density K, so that a large quantity of PTRSs are carried on the frequency domain resources corresponding to each QCL assumption, to improve phase estimation performance.

Figure 7:
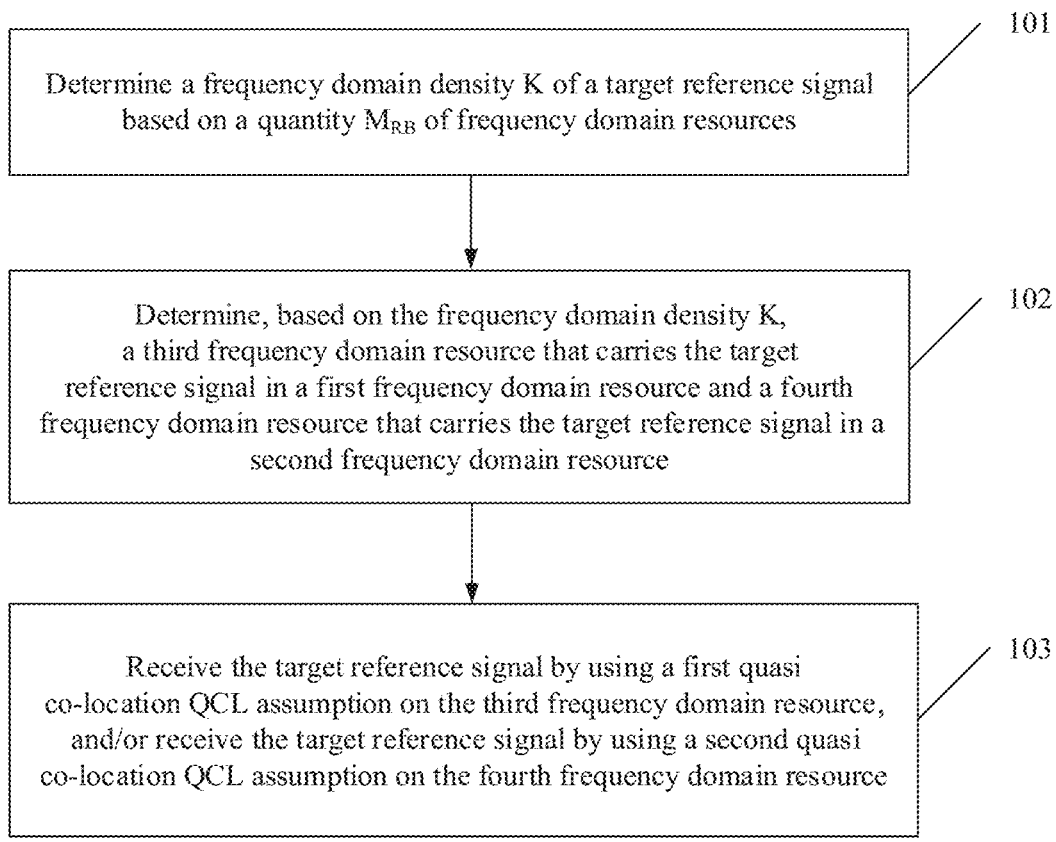
FIG. 7 is a schematic flowchart of a reference signal transmission method according to an embodiment of this application.

As shown in FIG. 7, the reference signal transmission method may include the following steps.

101: A receive end determines a frequency domain density K of a target reference signal based on a quantity $M_{RB}$ of frequency domain resources.

In an optional implementation, the quantity $M_{RB}$ of frequency domain resources is greater than zero and less than $N_{RB}$, and $N_{RB}$ is a quantity of scheduled frequency domain resources. It can be learned that $M_{RB}$ used when the frequency domain density K is determined in this implementation is less than $N_{RB}$. Therefore, the determined frequency domain density K is small. It can be learned by using a formula (1) that RBs carrying PTRSs are close, to help improve a density of carrying the PTRS. Further, when a quantity of scheduled RBs is small, a redundant PTRS can be avoided based on the reference signal transmission method in this application.

In an optional implementation, $M_{RB}$ is equal to dividing $N_{RB}$ by $N_{QCL}$ and performing a ceiling operation, or is equal to dividing $N_{RB}$ by $N_{QCL}$ and performing a floor operation, and $N_{QCL}$ is a total quantity of QCL assumptions associated with the scheduled frequency domain resources. The total quantity is a quantity of TCI states or QCL assumptions indicated by a TCI field in DCI.

Optionally, $N_{QCL}$ is 2.

Optionally, $N_{QCL}$ is a quantity of TCI states indicated by a TCI field in DCI.

Optionally, $N_{QCL}$ is a quantity of TCI states indicated by a TCI field configured by using RRC signaling.

Optionally, $M_{RB}$ is equal to dividing $N_{RB}$ by $N_{QCL}$.

It should be noted that, the quantity of frequency domain resources in this specification is a quantity of frequency domain resource blocks included in the frequency domain resources. For example, the frequency domain resource block is an RB, that is, the quantity of frequency domain resources is a quantity of RBs included in the frequency domain resources.

In another optional implementation, $M_{RB}$ is equal to a quantity of first frequency domain resources, or is equal to a quantity of second frequency domain resources. In other words, $M_{RB}$ is equal to a quantity of RBs of a frequency domain resource associated with one QCL assumption in all RBs occupied by a scheduled PDSCH.

102: The receive end determines, based on the frequency domain density K, a third frequency domain resource that carries the target reference signal in the first frequency domain resource and a fourth frequency domain resource that carries the target reference signal in the second frequency domain resource.

The scheduled frequency domain resources include the first frequency domain resource and the second frequency domain resource. The first frequency domain resource is associated with a first quasi co-location QCL assumption, and the second frequency domain resource is associated with a second QCL assumption.

In an optional implementation, that the receive end determines, based on the frequency domain density K, a third frequency domain resource that carries the target reference signal in the first frequency domain in step 102 includes: mapping the PTRS once starting from a reference frequency domain resource block in the scheduled frequency domain resources at an interval of K frequency domain resource blocks, to obtain one or more frequency domain resource blocks; and using one or more frequency domain resource blocks belonging to the first frequency domain resource in the one or more frequency domain resource blocks as the third frequency domain resource that carries the target reference signal.

Correspondingly, that the receive end determines, based on the frequency domain density K, a fourth frequency domain resource that carries the target reference signal in the second frequency domain resource includes: mapping the PTRS once starting from the reference frequency domain resource block in the scheduled frequency domain resources at an interval of K frequency domain resource blocks, to obtain one or more frequency domain resource blocks; and using one or more frequency domain resource blocks belonging to the second frequency domain resource in the one or more frequency domain resource blocks as the fourth frequency domain resource that carries the target reference signal.

Optionally, that the receive end determines, based on the frequency domain density K, a frequency domain resource used to carry the target reference signal includes: mapping the PTRS once starting from the reference frequency domain resource block in the scheduled frequency domain resources at an interval of K frequency domain resource blocks, to obtain one or more frequency domain resource blocks. If the frequency domain resource used to carry the target reference signal belongs to the first frequency domain resource, the frequency domain resource is the third frequency domain resource. In addition, for a received QCL assumption of the carried target reference signal, refer to the first QCL assumption associated with the first frequency domain resource. If the frequency domain resource used to carry the target reference signal belongs to the second frequency domain resource, the frequency domain resource is the fourth frequency domain resource. In addition, for a received QCL assumption of the carried target reference signal, refer to the second QCL assumption associated with the second frequency domain resource.

Figure 8:
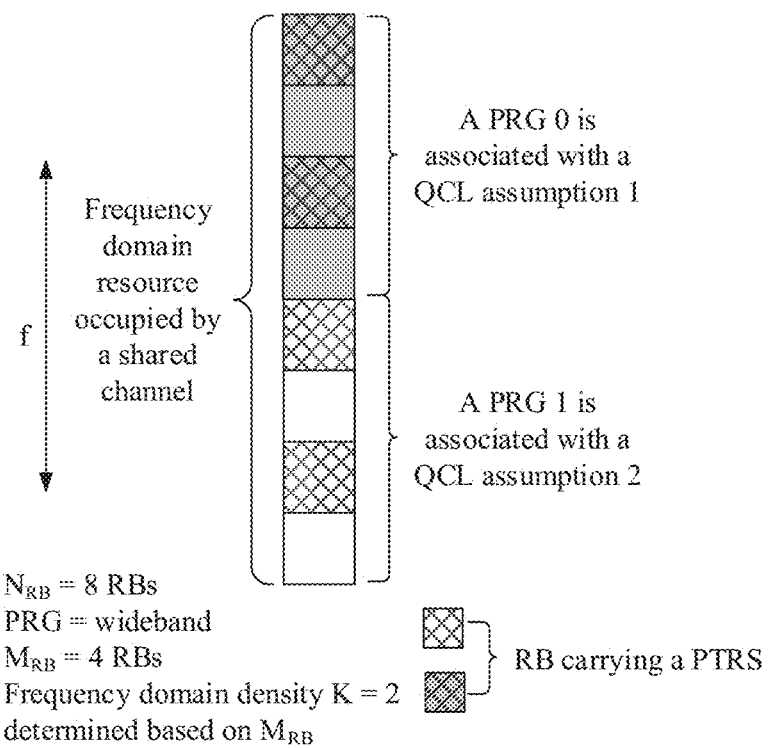
FIG. 8 is a schematic diagram of carrying a PTRS in still another scheduled frequency domain resource according to an embodiment of this application.

For example, as shown in FIG. 8, FIG. 8 shows the same association relationship between a PRG group and a QCL assumption and the same scheduled frequency domain resources as those in FIG. 5. $M_{RB}$ is equal to dividing $N_{RB}$ by $N_{QCL}$ and performing a ceiling operation, that is, $M_{RB}$ is equal to 4. Because 4 is less than 8, similar to FIG. 5, if the frequency domain density is determined by using a preset value shown in Table 2, the frequency domain density determined by using 4 may be less than the frequency domain density 4 determined by using 8. Therefore, it is assumed that the frequency domain density K determined based on $M_{RB}$ that is equal to 4 is equal to 2. Assuming that a reference RB in the 8 RBs is the $1^{st}$ RB in a PRG 0, the PTRS is mapped once at an interval of 2 RBs, and one or more obtained RBs are respectively the $1^{st}$ RB and the $3^{rd}$ RB in the PRG 0, and the $1^{st}$ RB and the $3^{rd}$ RB in a PRG 1. It can be learned that, in FIG. 8, two RBs carry PTRSs on a frequency domain resource associated with each QCL assumption. Compared with FIG. 5, a quantity of PTRSs carried on the frequency domain resource associated with each QCL assumption is increased, to help improve phase estimation performance.

In another optional implementation, in step 102, the third frequency domain resource and the fourth frequency domain resource may be determined according to the foregoing formula (1).

$k_{ref}^{RB}$ in the formula (1) may be determined according to the following formula:

$$k_{ref}^{RB} = \begin{cases} n_{RNTI} \mod K & \text{if (if)} \quad M_{RB} \mod K = 0 \\ n_{RNTI} \mod (M_{RB} \mod K) & \text{otherwise (otherwise)} \end{cases} \quad (2)$$

$n_{RNTI}$ is a sequence value used for the DCI.

Further, specific subcarriers that carry the PTRSs in the third frequency domain resource and the fourth frequency domain resource may be determined according to the following formula:

$$k = k_i^{RB} + (iK + k_{ref}^{RB})N_{SC}^{RB} \quad (3)$$

A reference position of k is a start subcarrier position in the frequency domain resource block. In other words, if the start subcarrier position in the frequency domain resource block is a subcarrier 0, k=1, indicating that a subcarrier that carries the PTRS in the frequency domain resource block is a subcarrier with an offset of 1 from the subcarrier 0, that is, a subcarrier 1. $N_{sc}^{RB}$ indicates a total quantity of subcarriers in one frequency domain resource block.

In still another optional implementation, that the receive end determines, based on the frequency domain density K, a third frequency domain resource that carries the target reference signal in the first frequency domain in step 102 includes: mapping the PTRS once starting from a reference frequency domain resource block in the first frequency domain resource at an interval of K frequency domain resource blocks, to obtain one or more frequency domain resource blocks as the third frequency domain resource that carries the target reference signal.

That the receive end determines, based on the frequency domain density K, a fourth frequency domain resource that carries the target reference signal in the second frequency domain resource includes: mapping the PTRS once starting from a reference frequency domain resource block in the second frequency domain resource at an interval of K frequency domain resource blocks, to obtain one or more frequency domain resource blocks as the fourth frequency domain resource that carries the target reference signal.

For example, as shown in FIG. 8, for the PRG 0, it is assumed that a reference frequency domain resource block in the PRG 0 is the $1^{st}$ RB. The PTRS is mapped once starting from the $1^{st}$ RB at an interval of two RBs, and one or more obtained RBs are respectively the $1^{st}$ RB and the $3^{rd}$ RB in the PRG 0. Similarly, for the PRG 1, an RB carrying the PTRS may also be determined in this implementation.

In this implementation, when frequency domain resources associated with the QCL assumptions are not consecutive, this helps avoid a case in which some frequency domain resources associated with the QCL assumptions do not carry the PTRS.

In this implementation, the frequency domain resource that carries the PTRS may alternatively be determined by using the foregoing formulas (1) to (3).

Figure 9A:
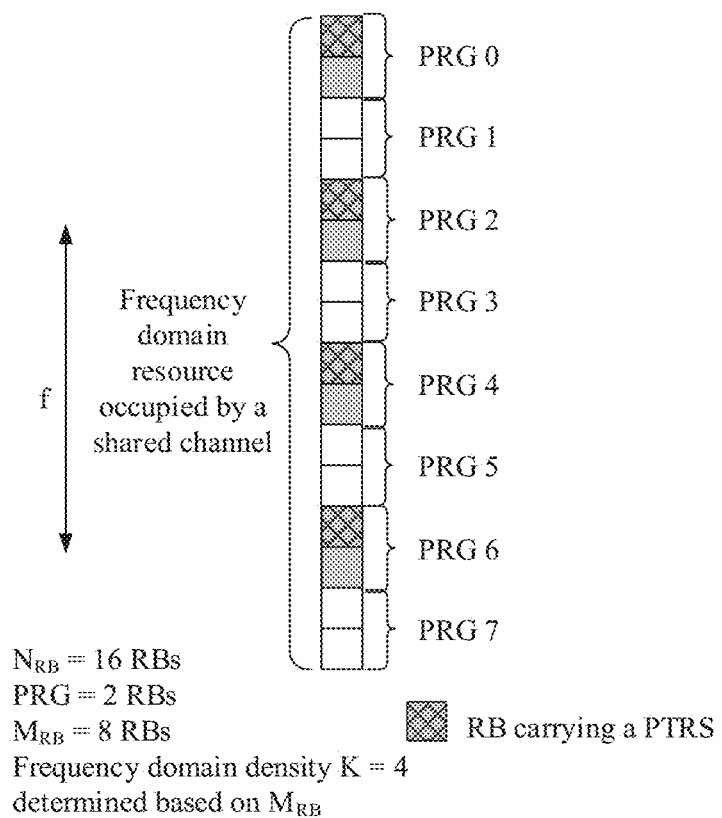
FIG. 9A is a schematic diagram of carrying a PTRS in still another scheduled frequency domain resource according to an embodiment of this application.

For example, in FIG. 9A, it is assumed that $N_{RB}$ is equal to 16, $M_{RB}$ is equal to 8, and K determined based on $M_{RB}$ is 4; the PRG indication is 2, and two RBs are a PRG group; a PRG group with an even index number is associated with the QCL assumption 1, and a PRG group with an odd index number is associated with the QCL assumption 2. In this case, an association relationship between each PRG group and each QCL assumption is that shown in FIG. 9A. A PRG indicated by using a gray-filled box is associated with the QCL assumption 1, and a PTRS indicated by using a white-filled box is associated with the QCL assumption 2. If the $1^{st}$ RB in the 16 RBs is used as a reference RB, the PTRS is mapped once starting from the reference RB at an interval of four RBs, and obtained RBs carrying the PTRSs are respectively RBs or PRGs indicated by using gray grid-filled boxes shown in FIG. 9A.

Figure 9B:
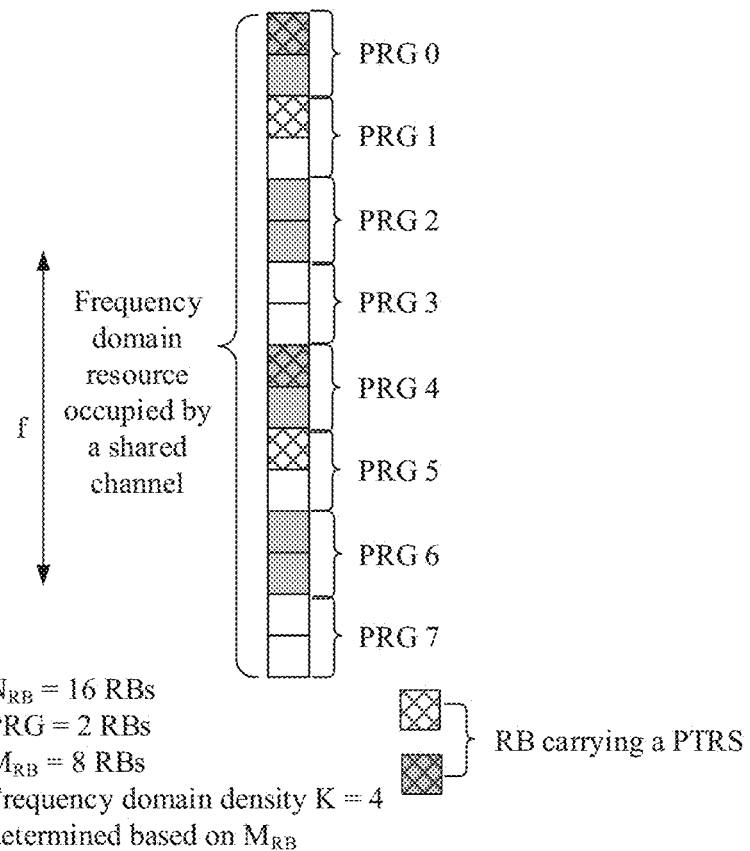
FIG. 9B is a schematic diagram of carrying a PTRS in still another scheduled frequency domain resource according to an embodiment of this application.

It can be learned that the frequency domain resource associated with the QCL assumption 2 does not carry the PTRS. Therefore, for this case, both a transmit end and the receive end may determine, by using the mapping manner described in the foregoing implementation, the RB that carries the PTRS. For example, as shown in FIG. 9B, an assumption case in FIG. 9B is the same as that in FIG. 9A. A difference is that, in FIG. 9B, an RB carrying the PTRS is first determined for a frequency domain resource associated with the QCL assumption 1, and then an RB carrying the PTRS is determined for a frequency domain resource associated with the QCL assumption 2. In this way, the PTRS distribution shown in FIG. 9B may be obtained, so that a frequency domain resource associated with each QCL assumption carries the PTRS.

103: The receive end receives the target reference signal by using the first quasi co-location QCL assumption on the third frequency domain resource, and receives the target reference signal by using the second quasi co-location QCL assumption on the fourth frequency domain resource.

The target reference signal carried on the third frequency domain resource is associated with a DMRS carried on the first frequency domain resource. Alternatively, a target reference signal port (for example, a PTRS port) corresponding to the target reference signal carried on the third frequency domain resource is associated with a DMRS port corresponding to a DMRS carried on the first frequency domain resource. The receive end may obtain the first QCL assumption through measurement on the DMRS carried on the third frequency domain resource, for example, a QCL assumption type A, type B, or type D to receive the PTRS. The receive end may further perform phase estimation by using the PTRS carried on the third frequency domain resource, and receive, by using a phase estimation result and the first QCL assumption, data and the DMRS that are carried on the first frequency domain resource.

Alternatively, the receive end may further assist DMRS estimation by using a phase estimation result obtained by using the PTRS. For example, assuming that the target reference signal carried on the third frequency domain resource corresponds to a target reference signal port (for example, a PTRS port) 0, and the DMRS carried on the first frequency domain resource corresponds to a DMRS port 0, the target reference signal port (for example, the PTRS port) 0 is associated with the DMRS port 0, indicating that QCL types A and QCL types D used by the target reference signal port (for example, the PTRS port) 0 and the DMRS port 0 are the same, and an estimation result of the PTRS corresponding to the target reference signal port (for example, the PTRS port) 0 may be used to adjust QCL types B used by the DMRS port 0.

The target reference signal carried on the fourth frequency domain resource is associated with a DMRS carried on the second frequency domain resource. Alternatively, a target reference signal port (for example, a PTRS port) corresponding to the target reference signal carried on the fourth frequency domain resource is associated with a DMRS port corresponding to a DMRS carried on the second frequency domain resource. The receive end may obtain the second QCL assumption through measurement on the DMRS carried on the fourth frequency domain resource, for example, a QCL assumption type A, type B, or type D to receive the PTRS. The receive end may further perform phase or phase estimation by using the PTRS carried on the fourth frequency domain resource, and receive, by using a phase estimation result and the second QCL assumption, data and the DMRS that are carried on the second frequency domain resource.

Alternatively, the receive end may further assist DMRS estimation by using a phase estimation result obtained by using the PTRS. For example, assuming that the target reference signal carried on the fourth frequency domain resource corresponds to a target reference signal port (for example, a PTRS port) 1, and the DMRS carried on the first frequency domain resource corresponds to a DMRS port 1, the target reference signal port (for example, the PTRS port) 1 is associated with the DMRS port 1, indicating that QCL types A and QCL types D used by the target reference signal port (for example, the PTRS port) 1 and the DMRS port 1 are the same, and an estimation result of a channel parameter (for example, a phase) of the target reference signal corresponding to the target reference signal port (for example, the PTRS port) 1 may be used to adjust a channel parameter used by the DMRS port 1.

In conclusion, in the reference signal transmission method shown in FIG. 7, the frequency domain density K is determined by using a frequency domain resource less than $N_{RB}$, so that phase estimation performance can be improved.

In still another optional embodiment, for an implementation in which the target reference signal is separately mapped to the first frequency domain resource and the second frequency domain resource in step 102, that is, an implementation in which the target reference signal corresponding to the target reference signal port (for example, the PTRS port) 0 is carried only on an RB corresponding to the target reference signal port (for example, the PTRS port) 0, and the target reference signal (for example, the PTRS) corresponding to the target reference signal port (for example, the PTRS port) 1 is carried only on an RB corresponding to the target reference signal port (for example, the PTRS port) 1, in step 101, a frequency domain density K1 of the first frequency domain resource and a frequency domain density K2 of the second frequency domain resource may also be respectively determined.

For example, when the PRG indication is a wideband, the first $\lceil N_{RB}/2 \rceil$ RBs are used to determine the frequency domain density K1 of the PTRS corresponding to the PTRS port 0, and the remaining $\lfloor N_{RB}/2 \rfloor$ RBs are used to determine the frequency domain density K2 of the PTRS corresponding to the PTRS port 1. Because quantities of frequency domain resources associated with various QCL assumptions are not necessarily strictly equal, frequency domain densities of two PTRS ports may be different. The PTRS corresponding to the PTRS port 0 is mapped only to the first $\lceil N_{RB}/2 \rceil$ RBs (where the first $\lceil N_{RB}/2 \rceil$ RBs are associated with the QCL assumption 1), and the PTRS corresponding to the PTRS port 1 is mapped only to the remaining $\lfloor N_{RB}/2 \rfloor$ RBs (where the remaining $\lfloor N_{RB}/2 \rfloor$ RBs are associated with the QCL assumption 2). The PTRS corresponding to the PTRS port 0 is mapped once on the first $\lceil N_{RB}/2 \rceil$ RBs at an interval of K1 RBs, and the PTRS corresponding to the PTRS port 1 is mapped once on remaining $\lfloor N_{RB}/2 \rfloor$ RBs at an interval of K2 RBs.

For another example, when the PRG indication is 2 or 4, a quantity of RBs of all PRGs with even index numbers is used to determine the frequency domain density K1 of the PTRS corresponding to the PTRS port 0, and a quantity of RBs of all PRGs with odd index numbers is used to determine the frequency domain density K2 of the PTRS corresponding to the PTRS port 1. The PTRS corresponding to the PTRS port 0 is mapped only to all the PRGs with the even index numbers (where all the PRGs with the even index numbers are associated with the QCL assumption 1). The PTRS corresponding to the PTRS port 1 is mapped only to all the PRGs with the odd index numbers (where all the PRGs with the odd index numbers are associated with the QCL assumption 2). The PTRS corresponding to the PTRS port 0 is mapped once on even PRGs at an interval of K1 RBs, and the PTRS corresponding to the PTRS port 1 is mapped once on odd PRGs at an interval of K2 RBs.

Third: Reference Signal Transmission Method 2 on a Frequency Domain Resource

In a multipoint coordination transmission scenario, different QCL assumptions may be used to receive corresponding data and DMRSs on different frequency domain resources. However, in view of a QCL assumption for receiving a PTRS, in addition to the case in which the PTRS is also received by using different QCL assumptions described in the transmission method 1 (where the PTRS may be received by a single port, but QCL assumptions on different frequency domain resources are different; or the PTRS may be received by a plurality of ports, and QCL assumptions of different ports are different), the PTRS may alternatively be limited to being received by using only one QCL assumption. In this case, problems such as a processing capability of UE and resource overheads occupied by RSs are mainly considered. In this case, a QCL assumption used for the PTRS and an association relationship between the PTRS and a DMRS also become an urgent problem to be resolved. Therefore, this application further provides a reference signal transmission method. The reference signal transmission method may be used in a case in which a target reference signal port uses only one QCL assumption for receiving.

Manner 1

The target reference signal port (for example, a PTRS port) may be associated with one of a plurality of QCL assumptions indicated by DCI. That is, the QCL assumption is used to receive the target reference signal on the target reference signal port.

The foregoing association relationship may be predefined, that is, when a plurality of QCL assumptions are indicated in DCI or RRC signaling, the $1^{st}$ QCL assumption is used as the QCL assumption of the PTRS by default, or the $2^{nd}$ QCL assumption is used as the QCL assumption of the PTRS by default.

Optionally, the target reference signal port (for example, the PTRS port) may be carried on a frequency domain resource corresponding to the QCL assumption associated with the target reference signal port.

Figure 10:
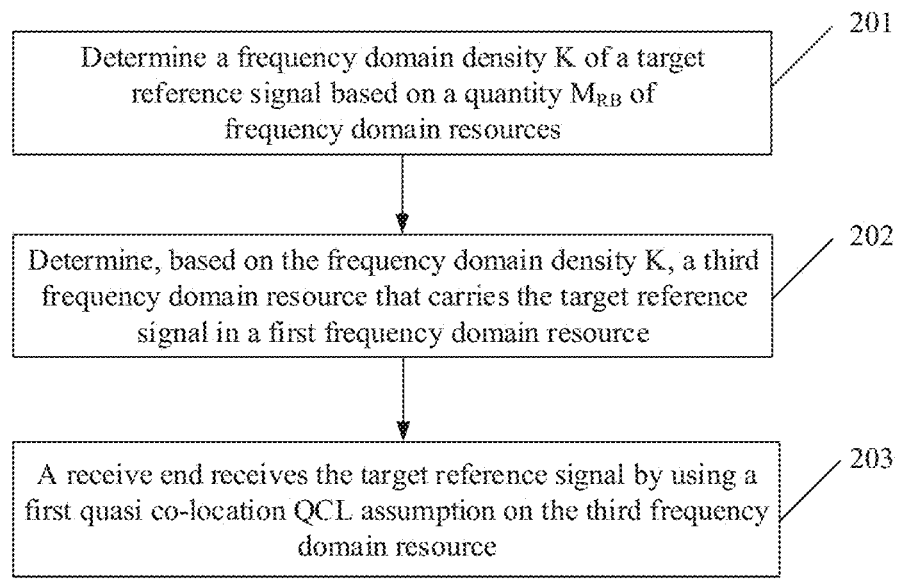
FIG. 10 is a schematic flowchart of another reference signal transmission method according to an embodiment of this application.

In other words, in a case, an example in which the PTRS port is associated with a first QCL assumption is used. A receive end only needs to determine a third frequency domain resource that carries the PTRS in a first frequency domain resource. Correspondingly, the receive end only needs to receive, by using the first QCL assumption, the PTRS carried on the third frequency domain resource. In another case, an example in which the PTRS port is associated with a second QCL assumption is used. A receive end only needs to determine a fourth frequency domain resource that carries the PTRS in a second frequency domain resource. Correspondingly, the receive end only needs to receive, by using the second QCL assumption, the PTRS carried on the fourth frequency domain resource. In FIG. 10, the first case is used as an example for description.

Optionally, the PTRS port may be associated with a DMRS port corresponding to a QCL assumption.

Optionally, QCL assumptions of the PTRS port and the associated DMRS port are the same. Specifically, the QCL assumption includes one or more of QCL assumptions type A, type B, and type D.

Optionally, QCL assumptions of the PTRS port and an unassociated DMRS port are different, that is, a QCL assumption of the unassociated DMRS port is different from a QCL assumption of the PTRS port. In this case, the QCL assumptions type B of the PTRS port and the unassociated DMRS port are the same. In other words, DMRS ports using a plurality of QCL assumptions share the PTRS port, or DMRSs in all scheduling bandwidths share the PTRS.

As shown in FIG. 10, the target reference signal transmission method may include the following steps.

201: A receive end determines a frequency domain density K of a target reference signal based on a quantity $M_{RB}$ of frequency domain resources.

$M_{RB}$ may be equal to a quantity of frequency domain resources associated with a QCL assumption, is equal to $N_{RB}$ divided by $N_{QCL}$ and performing a ceiling operation, or is equal to $N_{RB}$ divided by $N_{QCL}$ and performing a floor operation. $N_{RB}$ is a quantity of scheduled frequency domain resources. $N_{QCL}$ is a total quantity of QCL assumptions associated with the scheduled frequency domain resources.

202: The receive end determines, based on the frequency domain density K, a third frequency domain resource that carries the target reference signal in a first frequency domain resource.

In an optional implementation, that the receive end determines, based on the frequency domain density K, a third frequency domain resource that carries the target reference signal in a first frequency domain resource includes: mapping a PTRS once starting from a reference frequency domain resource block in the first frequency domain resource at an interval of K frequency domain resource blocks, to obtain one or more frequency domain resource blocks as the third frequency domain resource that carries the target reference signal.

Optionally, the frequency domain resource that carries the PTRS may alternatively be determined by using the foregoing formulas (1) to (3). It should be noted that, in this case, a maximum value of i in the formulas (1) and formula (2) is determined based on a quantity of first frequency domain resources.

203: The receive end receives the target reference signal by using a first quasi co-location QCL assumption on the third frequency domain resource.

The scheduled frequency domain resources include the first frequency domain resource and a second frequency domain resource. The first frequency domain resource is associated with the first quasi co-location QCL assumption, and the second frequency domain resource is associated with a second QCL assumption.

It can be learned that, compared with the embodiment shown in FIG. 7, steps 201 to 203 in this embodiment are respectively parts in steps 101 to 103. Therefore, for related descriptions of steps 201 to 203, refer to related content in the foregoing second part. Details are not described herein again.

For example, when a PRG indication is a wideband, a PTRS port determines, starting from a reference RB in the first $\lceil N_{RB}/2 \rceil$ RBs by using a QCL assumption associated with the first $\lceil N_{RB}/2 \rceil$ RBs in a manner of mapping the PTRS once at an interval of K RBs, the frequency domain resource that carries the PTRS. In this case, it may be understood that the PTRS port is associated with a DMRS port on the first $\lceil N_{RB}/2 \rceil$ RBs.

That is, QCL assumptions type A and/or type D of the PTRS port and the DMRS port are the same, but the PTRS is not associated with a DMRS port located on remaining RBs. That is, a QCL type B of the PTRS is only the same as a QCL type B of the DMRS port. For another example, a PRG indication is 2 or 4. Assuming that the PTRS port is associated with a QCL assumption corresponding to a PRG with an even index number, the frequency domain resource that carries the PTRS is determined starting from a reference RB in all PRGs with even index numbers in a manner of mapping the PTRS once at an interval of K RBs. For a quantity of RBs of all the PRGs with the even index numbers, mapping is performed once at an interval of K RBs. In this case, it may be understood that the PTRS port is associated with a DMRS port located on an even PRG, that is, QCL assumptions type A and/or type D of the PTRS port and the DMRS port are the same, but the PTRS is not associated with a DMRS port located on an odd PRG. That is, a QCL type B of the PTRS is only the same as a QCL type B of the DMRS port.

Figure 11:
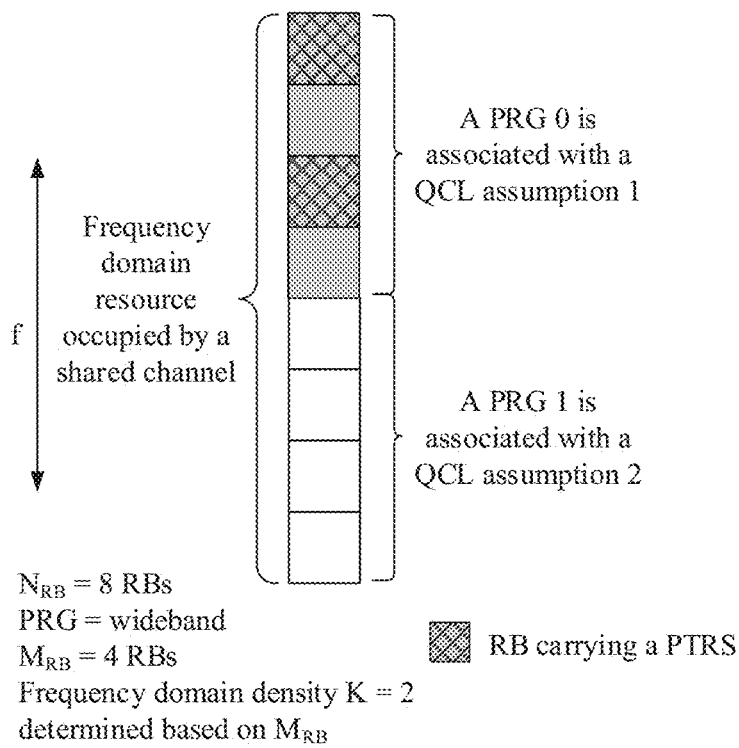
FIG. 11 is a schematic diagram of carrying a PTRS in a scheduled frequency domain resource when one PTRS port is configured according to an embodiment of this application.

For example, the frequency domain densities in FIG. 11 and FIG. 8 are the same. It is assumed that a PTRS port 0 is configured and the PTRS port 0 is associated with a QCL assumption 1. Assuming that a reference RB in all PRGs with even index numbers associated with the QCL assumption 1 is the $1^{st}$ RB, based on the reference signal transmission method described in FIG. 10, it may be determined that an RB carrying the PTRS is an RB indicated by a gray grid-filled box in FIG. 11. Correspondingly, the receive end may receive the PTRS on these RBs by using the QCL assumption 1. It can be learned that a frequency domain resource associated with a QCL assumption 2 does not carry the PTRS. It can be learned that the target reference signal transmission method can specify a transmission rule of the PTRS, to avoid a problem that transmission performance is affected due to an unclear rule.

Manner 2

For a case in which the target reference signal port is received by using only one QCL assumption, this application further provides a target reference signal (for example, a PTRS) transmission method. The target reference signal (for example, the PTRS) transmission method is different from the implementation in the manner 1. In the reference signal transmission method of the manner 2, a manner of mapping the target reference signal is determined based on all scheduling bandwidths, that is, both a frequency domain density and a mapping manner are determined based on all the scheduling bandwidths.

Optionally, a PTRS port may be associated with a DMRS port corresponding to a QCL assumption.

Optionally, QCL assumptions of the PTRS port and the associated DMRS port are the same. Specifically, the QCL assumption includes one or more of QCL assumptions type A, type B, and type D.

Optionally, QCL assumptions of the PTRS port and an unassociated DMRS port are different, that is, a QCL assumption of the unassociated DMRS port is different from a QCL assumption of the PTRS port. In this case, the QCL assumptions type B of the PTRS port and the unassociated DMRS port are the same. In other words, DMRS ports using a plurality of QCL assumptions share the PTRS port, or DMRSs in all scheduling bandwidths share the PTRS.

Optionally, in the reference signal transmission method, for determining the frequency domain density K, refer to related content of 101 in FIG. 7. For determining the frequency domain resource that carries the target reference signal, refer to related content of 102 in FIG. 7. Different from the operation of 103 in FIG. 7, in the reference signal transmission method, the receive end may receive, based on a first QCL assumption or a second QCL assumption, the target reference signals (for example, the PTRSs) carried on a third frequency domain resource and a fourth frequency domain resource. Optionally, the receive end may use a channel parameter (for example, a frequency offset) estimation result of the target reference signal (for example, the PTRS) to adjust a channel parameter (for example, a QCL type-B) in the first QCL assumption and/or the second QCL assumption.

In conclusion, when one target reference signal port (for example, a PTRS port) is configured, in the manner 1 and the manner 2, signaling may be used to indicate, to the receive end, a specific manner of receiving the target reference signal (for example, the PTRS). For example, when a QCL assumption used for a DMRS does not include the type D or includes only the QCL type B, the PTRS is sent in the PTRS mapping manner corresponding to the manner 2; otherwise, the PTRS is sent in the PTRS mapping manner corresponding to the manner 1.

Optionally, when a quantity of configured PTRS ports is 1, the PTRS is sent in the PTRS mapping manner corresponding to the manner 1; when a quantity of configured PTRS ports is 2, the PTRS is sent in the PTRS mapping manner corresponding to the manner 2.

In addition, when one target reference signal port (for example, the PTRS port) is configured, in the reference signal transmission method in the manner 1, it can be ensured that channel parameter (for example, a frequency offset) estimation of a QCL assumption is accurate, and low signaling overheads are kept; in the reference signal transmission method in the manner 2, it can be ensured that each QCL assumption has channel parameter (for example, a frequency offset) estimation, and a same target reference signal port (for example, the PTRS port) is shared, to reduce signaling overheads and complexity of the channel parameter (for example, the frequency offset) estimation. This avoids a case in which in a current multipoint coordination transmission scenario, one target reference signal port (for example, the PTRS port) is configured, resulting in an unclear rule of how to associate the target reference signal (for example, the PTRS) with two QCL assumptions, further causing an inaccurate channel parameter (for example, the frequency offset) estimation result at the receive end.

In still another possible implementation, in the multipoint coordination transmission scenario, different QCL assumptions may be used on a same time-frequency domain resource to receive corresponding data and DMRSs, and data and a DMRS that correspond to each QCL assumption correspond to one different port, or each QCL assumption corresponds to a CDM group of DMRSs. For example, a DMRS port 0 or DMRS ports 0 and 1 (a CDM group 1) corresponds/correspond to a QCL assumption 1, a DMRS port 2 or DMRS ports 2 and 3 (a CDM group 2) corresponds/correspond to a QCL assumption 2. The PTRS on the time-frequency domain resource is limited to be received by using one QCL assumption, that is, one port is configured for the PTRS. In this case, problems such as a processing capability of UE and resource overheads occupied by RSs are considered. In this case, a QCL assumption used for the PTRS and an association relationship between the PTRS and a DMRS also become an urgent problem to be resolved.

The target reference signal port (for example, a PTRS port) may be associated with one of a plurality of QCL assumptions indicated by DCI. That is, the QCL assumption is used to receive the target reference signal on the target reference signal port.

The foregoing association relationship may be predefined, that is, when a plurality of QCL assumptions are indicated in DCI or RRC signaling, the $1^{st}$ QCL assumption is used as the QCL assumption of the PTRS by default, or the $2^{nd}$ QCL assumption is used as the QCL assumption of the PTRS by default.

Optionally, a PTRS port may be associated with a DMRS port corresponding to a QCL assumption.

Optionally, QCL assumptions of the PTRS port and the associated DMRS port are the same. Specifically, the QCL assumption includes one or more of QCL assumptions type A, type B, and type D.

Optionally, QCL assumptions of the PTRS port and an unassociated DMRS port are different, that is, a QCL assumption of the unassociated DMRS port is different from a QCL assumption of the PTRS port. In this case, the QCL assumptions type B of the PTRS port and the unassociated DMRS port are the same. In other words, DMRS ports using a plurality of QCL assumptions share the PTRS port.

Figure 12:
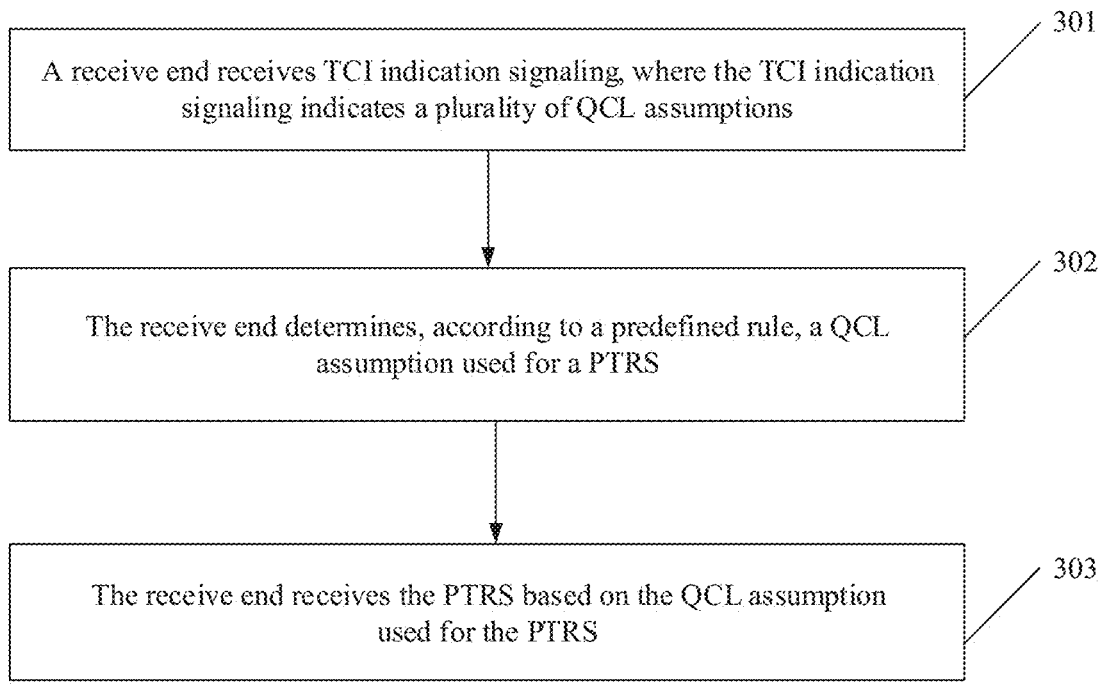
FIG. 12 is a schematic flowchart of still another reference signal transmission method according to an embodiment of this application.

As shown in FIG. 12, the reference signal transmission method may include the following steps.

301: A receive end receives TCI indication signaling, where the TCI indication signaling indicates a plurality of QCL assumptions (TCI states).

The plurality of QCL assumptions (TCI states) each correspond to one CDM group of DMRSs. For example, a CDM group 1 of DMRSs uses a QCL assumption 1 for receiving, and a CDM group 2 of DMRSs uses a QCL assumption 2 for receiving.

302: The receive end determines, according to a predefined rule, a QCL assumption used for a PTRS.

The $1^{st}$ QCL assumption or the last QCL assumption in the plurality of QCL assumptions may be used for the PTRS.

Optionally, the PTRS is associated with a DMRS port in a default CDM group. For example, the PTRS is associated with a DMRS port in the $1^{st}$ CDM group that is indicated, or the PTRS is associated with a DMRS port in the last CDM group that is indicated. The PTRS port and the associated DMRS port have a same QCL assumption type A and/or type D.

Optionally, the PTRS port and an unassociated DMRS port have a same QCL assumption type B.

303: The receive end receives the PTRS based on the QCL assumption used for the PTRS.

It can be learned that in the reference signal transmission method, when frequency domain resources used for multipoint coordination transmission are the same, a PTRS transmission method can be determined, to improve channel estimation performance.

Fourth: Reference Signal Transmission Method on a Time Domain Resource

To enable frequency offset estimation to be performed on a time domain resource associated with each QCL assumption, the time domain resource corresponding to each QCL assumption should be associated with a target reference signal port (for example, a PTRS port), to assist a DMRS carried on the time domain resource in performing channel estimation, and improve channel estimation performance. Therefore, for the foregoing multipoint coordination transmission scenario, two target reference signal ports (for example, PTRS ports) may be configured, and one target reference signal port (for example, a PTRS port) is associated with a QCL assumption used for data and a DMRS that are transmitted by one transmission node. For example, a target reference signal port (for example, a PTRS port) 0 is associated with a QCL assumption 1, and a target reference signal port (for example, a PTRS port) 2 is associated with a QCL assumption 2.

When each transmission reception point uses a different time domain resource to deliver data and a DMRS in the multipoint coordination scenario, that is, scheduled time domain resources include at least two time domain resources (that is, at least two time periods) in time domain, each time domain resource corresponds to one or more OFDM symbols, any two time domain resources do not overlap in time domain, and each time domain resource may be associated with a different QCL assumption. To enable independent channel parameter (for example, a frequency offset) estimation to be performed on time domain resources associated with different QCL assumptions, each time domain resource needs to carry a target reference signal (for example, a PTRS). Therefore, this application further provides a reference signal transmission method on a time domain resource.

Figure 13:
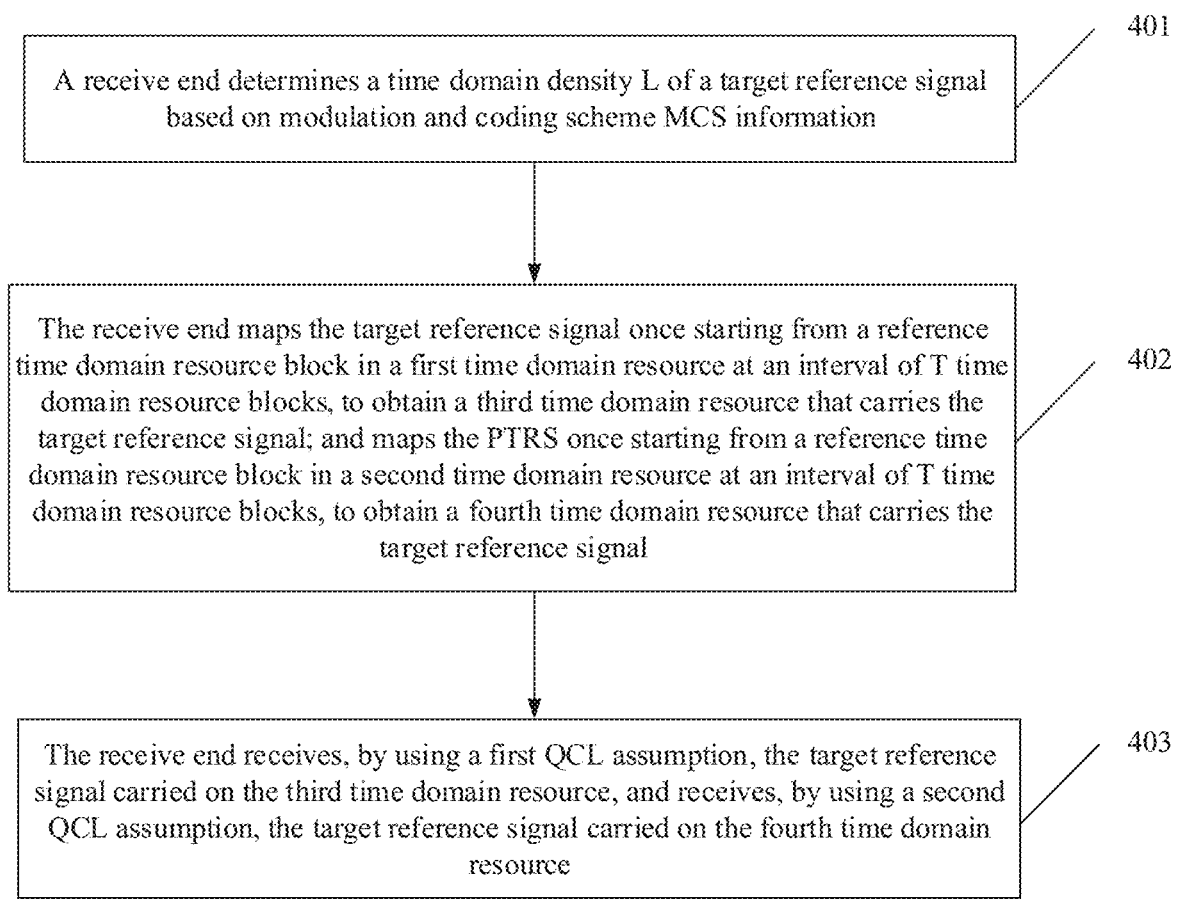
FIG. 13 is a schematic flowchart of still another reference signal transmission method according to an embodiment of this application.

As shown in FIG. 13, the reference signal transmission method includes the following steps.

401: A receive end determines a time domain density L of a target reference signal based on modulation and coding scheme MCS information.

402: The receive end maps the target reference signal once starting from a reference time domain resource block in a first time domain resource at an interval of L time domain resource blocks, to obtain a third time domain resource that carries the target reference signal; and maps the target reference signal once starting from a reference time domain resource block in a second time domain resource at an interval of L time domain resource blocks, to obtain a fourth time domain resource that carries the target reference signal.

403: The receive end receives, by using a first QCL assumption, the target reference signal carried on the third time domain resource, and receives, by using a second QCL assumption, the target reference signal carried on the fourth time domain resource.

The MCS information is used to indicate information such as a modulation and coding scheme of scheduled time domain resources. The scheduled time domain resources include the first time domain resource and the second time domain resource. The first time domain resource is associated with the first QCL assumption, and the second time domain resource is associated with the second QCL assumption.

A target reference signal port corresponding to the target reference signal carried on the third time domain resource is associated with a DMRS port corresponding to a DMRS carried on the first time domain resource. A target reference signal port corresponding to the target reference signal carried on the fourth time domain resource is associated with a DMRS port corresponding to a DMRS carried on the second time domain resource.

In this embodiment of this application, the modulation and coding scheme information may be one of a modulation and coding scheme index $I_{MCS}$, a modulation order Qm, a target code rate Rx, spectral efficiency, and the like.

For example, the modulation and coding scheme information is a modulation and coding scheme index $I_{MCS}$. That a receive end determines a time domain density L of a target reference signal based on modulation and coding scheme MCS information in step 401 may be: determining, by using a preset value shown in Table 3 (for example, ptrs-MCS$_1$, ptrs-MCS$_2$, ptrs-MCS$_3$, or ptrs-MCS$_4$), an interval in which $I_{MCS}$ is located, and further determining the time domain density L.

TABLE 3

| Time domain density L of a PTRS | |
| --- | --- |
| $I_{MCS}$ | Time domain density L |
| $I_{MCS}$ < ptrs-MCS$_1$ | There is no PTRS |
| ptrs-MCS$_1$ ≤ $I_{MCS}$ < ptrs-MCS$_2$ | 4 |
| ptrs-MCS$_2$ ≤ $I_{MCS}$ < ptrs-MCS$_3$ | 2 |
| ptrs-MCS$_3$ ≤ $I_{MCS}$ < ptrs-MCS$_4$ | 1 |

Figure 14:
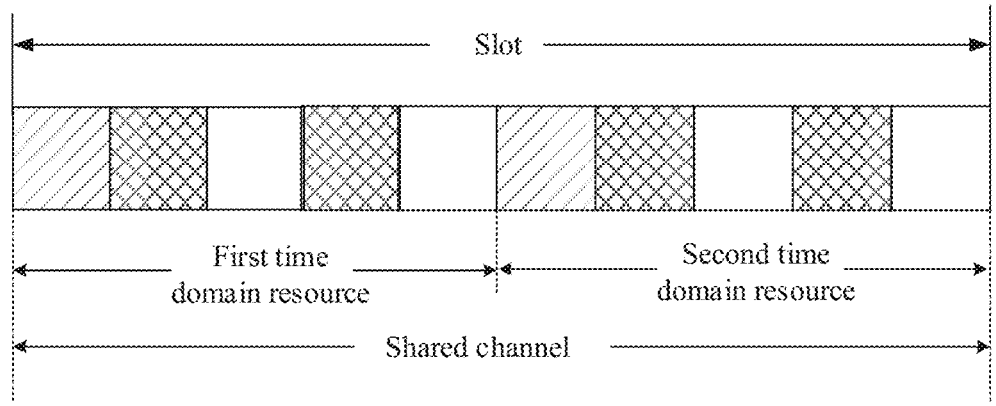
FIG. 14 is a schematic diagram of carrying a PTRS in a scheduled time domain resource according to an embodiment of this application.
Figure 14:
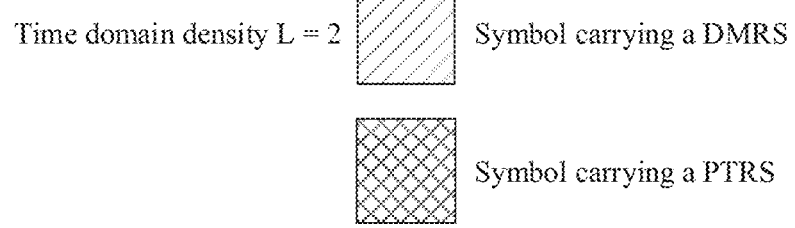

A specific determining manner of step 402 is described by using FIG. 14 as an example. As shown in FIG. 14, the first time domain resource is the $1^{st}$ symbol to the $5^{th}$ symbol in a slot, that is, the symbols indicated by using gray-filled boxes. The second time domain resource is the $6^{th}$ symbol to the $10^{th}$ symbol in the slot, that is, the symbols indicated by using white-filled boxes. In addition, the first time domain resource is associated with a QCL assumption 1, and the second time domain resource is associated with a QCL assumption 2. Assuming that the determined time domain density L is equal to 2, a symbol that carries a DMRS in the first time domain resource is the $1^{st}$ symbol in the slot, and a symbol that carries a DMRS in the second time domain resource is the $6^{th}$ symbol in the slot, the reference time domain resource block in the first time domain resource may be the $2^{nd}$ symbol in the slot, and the reference time domain resource block in the second time domain resource may be the $7^{th}$ symbol in the slot. Therefore, a PTRS is mapped once starting from the $2^{nd}$ symbol at an interval of L(2) symbols in the first time domain resource, and determined symbols that carry the PTRS are respectively the $2^{nd}$ symbol and the $4^{th}$ symbol in the slot; a PTRS is mapped once starting from the $7^{th}$ symbol at an interval of L(2) symbols in the second time domain resource, and determined symbols that carry the PTRS are respectively the $7^{th}$ symbol and the $9^{th}$ symbol in the slot. The symbols that carry the PTRS are symbols indicated by using gray grid-filled boxes in FIG. 14.

In step 403, after receiving, by using the first QCL assumption, the target reference signal carried on the third time domain resource, the receive end may receive, by using a channel parameter (for example, a frequency offset) estimation result of the target reference signal (for example, the PTRS) and the first QCL assumption, data and the DMRS that are carried on the first time domain resource. Correspondingly, after receiving, by using the second QCL assumption, the target reference signal carried on the fourth time domain resource, the receive end may receive, by using a channel parameter (for example, a frequency offset) estimation result of the target reference signal (for example, the PTRS) and the second QCL assumption, data and the DMRS that are carried on the second time domain resource.

It can be learned that in the reference signal transmission method shown in FIG. 12, in a multipoint coordination transmission scenario, when various transmission reception points of a shared channel with coordinated transmission use different time domain resources and two target reference signal ports (for example, PTRS ports) are configured, the target reference signal (for example, the PTRS) can be transmitted, so that channel parameter (for example, the frequency offset) estimation can be performed on a time domain resource associated with each QCL assumption, thereby improving reception performance.

In addition, in the multipoint coordination transmission scenario, when various transmission reception points of a shared channel with coordinated transmission use different time domain resources or a same time domain resource, but one target reference signal port (for example, a PTRS port) is configured, this application further provides a reference signal transmission method. In the reference signal transmission method, a receive end may perform step 301, perform some operations in step 302, and perform some operations in step 303.

Some operations in step 402 are as follows.

The receive end maps a PTRS once starting from a reference time domain resource block at an interval of L time domain resource blocks in a first time domain resource, to obtain a third time domain resource that carries the PTRS; or maps a PTRS once starting from a reference time domain resource block at an interval of L time domain resource blocks in a second time domain resource, to obtain a fourth time domain resource that carries the PTRS.

Some operations in step 403 are as follows.

The receive end receives, by using a first QCL assumption, the target reference signal carried on the third time domain resource; or receives, by using a second QCL assumption, the target reference signal carried on the fourth time domain resource.

When various transmission reception points of a shared channel with coordinated transmission use a same time domain resource, the first time domain resource is the same as the second time domain resource, and the third time domain resource is the same as the fourth time domain resource.

That is, one configured target reference signal port (for example, a PTRS port) is associated with one QCL assumption, and correspondingly, the PTRS may be mapped or carried on a time domain resource associated with the QCL assumption. Further, the receive end or a transmit end receives the target reference signal (for example, the PTRS) on the time domain resource by using the QCL assumption. A time domain resource associated with another QCL assumption does not carry the target reference signal (for example, the PTRS).

Alternatively, in another manner, a plurality of QCL assumptions indicated by DCI may be associated with a same target reference signal port (for example, a PTRS port). In this way, when the time domain resource that carries the target reference signal (for example, the PTRS) is determined based on the time domain density L, the target reference signal is sequentially mapped to scheduled time domain resources based on the time domain density L, instead of being remapped. In other words, the time domain resource that carries the target reference signal (for example, the PTRS) is time domain resource blocks that carry the target reference signal (for example, the PTRS) that are obtained by mapping the target reference signal (for example, the PTRS) once starting from a reference time domain resource block in the scheduled time domain resources at an interval of L time domain resource blocks until the last time domain resource block in the scheduled time domain resources. For example, in FIG. 14, it is assumed that a reference time domain resource block in a scheduled slot is the $2^{nd}$ symbol. Then, the PTRS is mapped once starting from the $2^{nd}$ symbol at an interval of two symbols until the PTRS is mapped once to the $9^{th}$ symbol, to obtain all symbols that carry the PTRS. The mapping manner in which mapping is performed starting from respective reference time domain resource blocks in the first time domain resource and the second time domain resource described in FIG. 12 does not need to be used.

Further, the receive end may receive, by using QCL types A and D of one of the QCL assumptions, the target reference signal (for example, the PTRS) carried on the scheduled time domain resources, and adjust a channel parameter (for example, QCL types B) in one or all of the QCL assumptions by using a channel parameter (frequency offset) estimation result of the target reference signal (for example, the PTRS).

The $1^{st}$ target reference signal (for example, the PTRS) transmission method in this part supports two target reference signal ports (for example, PTRS ports), to ensure that each QCL assumption has the target reference signal (for example, the PTRS) with frequency offset estimation, that is, the target reference signal is carried. The $2^{nd}$ target reference signal (for example, the PTRS) transmission method in this part may support a case in which one target reference signal port (for example, a PTRS port) is configured, to ensure that channel parameter (for example, the frequency offset) estimation of a QCL assumption is accurate and low signaling overheads are kept; or to ensure that each QCL assumption has channel parameter (for example, the frequency offset) estimation and shares a same target reference signal port (for example, the PTRS port), thereby reducing signaling overheads and complexity of the channel parameter (for example, the frequency offset) estimation. This avoids a case in which a rule for the receive end and the transmit end to associate two QCL assumptions with one target reference signal port (for example, the PTRS port) is unclear, causing inaccurate channel parameter (for example, the frequency offset) estimation at the receive end.

In this application, the reference signal transmission method in frequency domain provided above may be used in combination with the reference signal transmission method in time domain, that is, the reference signal transmission method in frequency domain may be used in combination with the reference signal transmission method in time domain. The target reference signal is transmitted on the scheduled time-frequency resources, to improve channel estimation performance.

Figure 15:
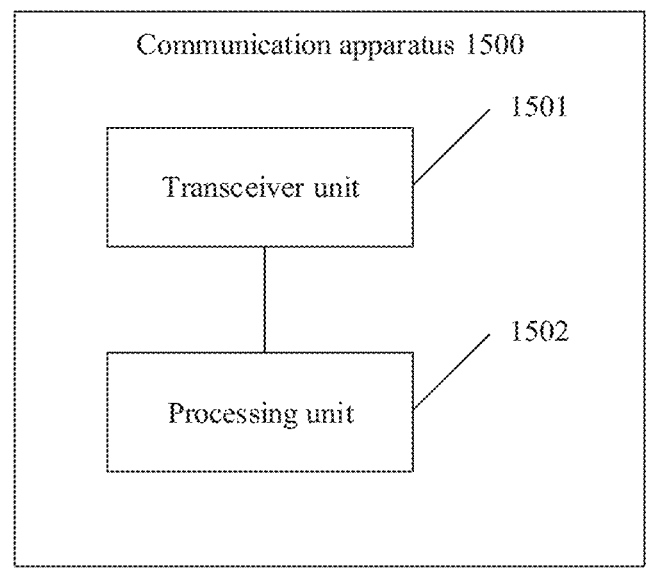
FIG. 15 is a schematic diagram of a structure of a communication apparatus according to an embodiment of this application.

FIG. 15 is a schematic diagram of a structure of a communication apparatus according to an embodiment of this application. The communication apparatus 1500 shown in FIG. 15 may include a transceiver unit 1501 and a processing unit 1502. The transceiver unit 1501 may include a sending unit and a receiving unit. The sending unit is configured to implement a sending function, the receiving unit is configured to implement a receiving function, and the transceiver unit 1501 may implement a sending function and/or a receiving function. The transceiver unit may alternatively be described as a communication unit.

The communication apparatus 1500 may be a terminal device, an apparatus in the terminal device, or an apparatus that can be used together with the terminal device.

In an implementation, the communication apparatus includes a transceiver unit 1501 and a processing unit 1502.

The processing unit 1502 is configured to: determine a frequency domain density K of a target reference signal based on a quantity $M_{RB}$ of frequency domain resources; determine, based on the frequency domain density K, a third frequency domain resource that carries the target reference signal in a first frequency domain resource and/or a fourth frequency domain resource that carries the target reference signal in a second frequency domain resource.

The transceiver unit 1501 is configured to: send, by using a first quasi co-location QCL assumption, the target reference signal carried on the third frequency domain resource, and/or send, by using a second quasi co-location QCL assumption, the target reference signal carried on the fourth frequency domain resource.

The quantity $M_{RB}$ of frequency domain resources is greater than zero and less than $N_{RB}$, $N_{RB}$ is a quantity of scheduled frequency domain resources, and the scheduled frequency domain resources include the first frequency domain resource and the second frequency domain resource.

The first frequency domain resource is associated with the first quasi co-location QCL assumption, and the second frequency domain resource is associated with the second QCL assumption.

In another implementation, the communication apparatus includes a transceiver unit 1501 and a processing unit 1502.

The processing unit 1502 is configured to: determine a time domain density L of a target reference signal based on modulation and coding scheme MCS information; map the target reference signal once starting from a reference time domain resource block in a first time domain resource at an interval of L time domain resource blocks, to obtain a third time domain resource that carries the target reference signal; and/or map the target reference signal once starting from a reference time domain resource block in a second time domain resource at an interval of L time domain resource blocks, to obtain a fourth time domain resource that carries the target reference signal.

The transceiver unit 1501 is configured to: receive, by using a first QCL assumption, the target reference signal carried on the third time domain resource, and/or receive, by using a second QCL assumption, the target reference signal carried on the fourth time domain resource.

The MCS information is used to indicate a modulation and coding scheme of scheduled time domain resources. The scheduled time domain resources include the first time domain resource and the second time domain resource. The first time domain resource is associated with the first QCL assumption, and the second time domain resource is associated with the second QCL assumption.

The communication apparatus 1300 may be a network device, an apparatus in the network device, or an apparatus that can be used together with the network device.

In an implementation, the processing unit 1502 is configured to: determine a frequency domain density K of a target reference signal based on a quantity $M_{RB}$ of frequency domain resources; determine, based on the frequency domain density K, a third frequency domain resource that carries the target reference signal in a first frequency domain resource and/or a fourth frequency domain resource that carries the target reference signal in a second frequency domain resource.

The quantity $M_{RB}$ of frequency domain resources is greater than zero and less than $N_{RB}$, $N_{RB}$ is a quantity of scheduled frequency domain resources, and the scheduled frequency domain resources include the first frequency domain resource and the second frequency domain resource.

The first frequency domain resource is associated with a first quasi co-location QCL assumption, and the second frequency domain resource is associated with a second QCL assumption.

The transceiver unit 1501 is configured to: send, by using the first quasi co-location QCL assumption, the target reference signal carried on the third frequency domain resource, and/or send, by using the second quasi co-location QCL assumption, the target reference signal carried on the fourth frequency domain resource.

For related content of this implementation, refer to related content of the foregoing method embodiments. Details are not described herein again.

In another implementation, the communication apparatus includes a transceiver unit 1501 and a processing unit 1502.

The processing unit 1502 is configured to: determine a time domain density L of a target reference signal based on modulation and coding scheme MCS information; map the target reference signal once starting from a reference time domain resource block in a first time domain resource at an interval of L time domain resource blocks, to obtain a third time domain resource that carries the target reference signal; and/or map the target reference signal once starting from a reference time domain resource block in a second time domain resource at an interval of L time domain resource blocks, to obtain a fourth time domain resource that carries the target reference signal.

The transceiver unit 1501 is configured to: send, by using a first QCL assumption, the target reference signal carried on the third time domain resource, and/or receive, by using a second QCL assumption, the target reference signal carried on the fourth time domain resource.

The MCS information is used to indicate a modulation and coding scheme of scheduled time domain resources. The scheduled time domain resources include the first time domain resource and the second time domain resource. The first time domain resource is associated with the first QCL assumption, and the second time domain resource is associated with the second QCL assumption.

Figure 16:
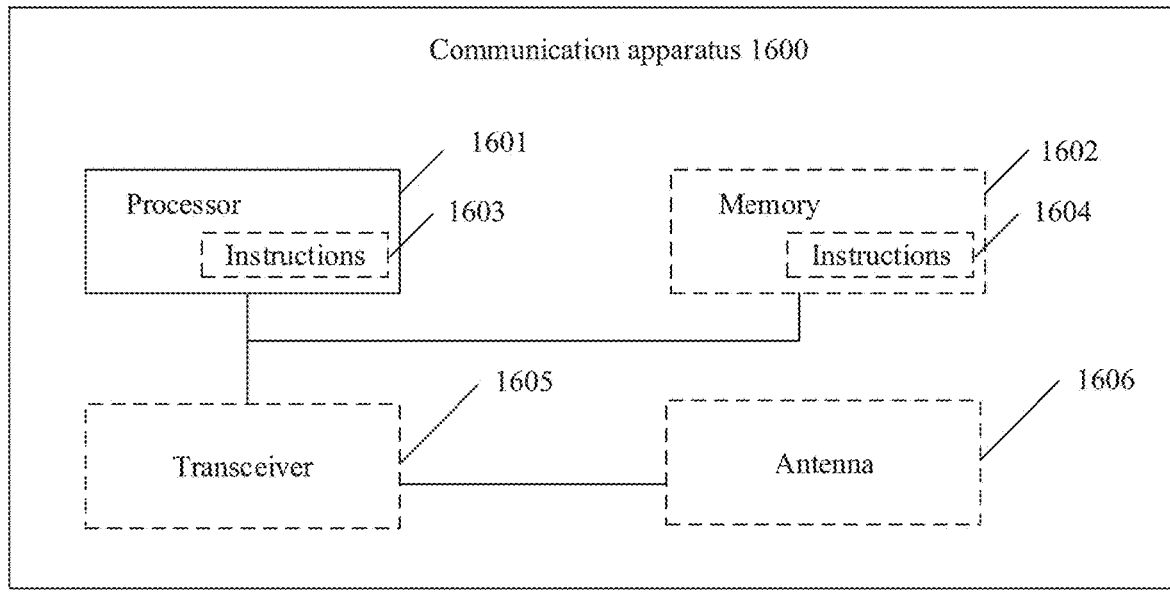
FIG. 16 is a schematic diagram of a structure of another communication apparatus according to an embodiment of this application.

FIG. 16 is a schematic diagram of a structure of a communication apparatus. The communication apparatus 1600 may be a network device, may be a terminal device, may be a chip, a chip system, a processor, or the like that supports a network device in implementing the foregoing methods, or may be a chip, a chip system, a processor, or the like that supports a terminal device in implementing the foregoing methods. The apparatus may be configured to implement the methods described in the foregoing method embodiments. For details, refer to the descriptions in the foregoing method embodiments.

The communication apparatus 1600 may include one or more processors 1601. The processor 1601 may be a general-purpose processor, a dedicated processor, or the like. For example, the processor 1601 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

Optionally, the communication apparatus 1600 may include one or more memories 1602. The memory 1602 stores instructions 1604, and the instructions may be run on the processor 1601, to enable the apparatus 1600 to perform the methods described in the foregoing method embodiments. Optionally, the memory 1602 may further store data. The processor 1601 and the memory 1602 may be separately disposed, or may be integrated together.

Optionally, the communication apparatus 1600 may further include a transceiver 1605 and an antenna 1606. The transceiver 1605 may be referred to as a transceiver unit, a transceiver machine, a transceiver circuit, or the like, and is configured to implement a transceiver function. The transceiver 1605 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function.

The communication apparatus 1600 is the terminal device. The processor 1601 is configured to perform steps 101 and 102 in FIG. 7, steps 201 and 202 in FIG. 10, steps 301 and 302 in FIG. 12, and steps 401 and 402 in FIG. 13. The transceiver 1605 is configured to perform step 103 in FIG. 7, step 203 in FIG. 10, step 303 in FIG. 12, and step 403 in FIG. 13.

The communication apparatus 1600 is the network device. The processor 1601 is configured to perform steps 101 and 102 in FIG. 7, steps 201 and 202 in FIG. 10, steps 301 and 302 in FIG. 12, and steps 401 and 402 in FIG. 13. The transceiver 1605 is configured to: perform step 103 in FIG. 7, where a "receiving" operation needs to be replaced with a "sending" operation; perform step 203 in FIG. 10, where a "receiving" operation needs to be replaced with a "sending" operation; perform step 303 in FIG. 12, where a "receiving" operation needs to be replaced with a "sending" operation; and perform step 403 in FIG. 13, where a "receiving" operation needs to be replaced with a "sending" operation.

In another possible design, the processor 1601 may include a transceiver configured to implement receiving and sending functions. For example, the transceiver may be a transceiver circuit, an interface, or an interface circuit. A transceiver circuit, an interface, or an interface circuit configured to implement the sending function and a transceiver circuit, an interface, or an interface circuit configured to implement the receiving function may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible design, optionally, the processor 1601 may store instructions 1603, and the instructions 1603 are run on the processor 1601, so that the communication apparatus 1600 performs the methods described in the foregoing method embodiments. The instructions 1603 may be fixed in the processor 1601, and in this case, the processor 1601 may be implemented by hardware.

In yet another possible design, the communication apparatus 1600 may include a circuit, and the circuit may implement the sending function, the receiving function, or the communication function in the foregoing method embodiments. The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (nMetal oxide semiconductor, NMOS), a P-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The communication apparatus in the foregoing embodiment may be a network device or a terminal device. However, a scope of the communication apparatus described in this application is not limited thereto, and a structure of the communication apparatus may not be limited by FIG. 14. The communication apparatus may be an independent device or a part of a large device. For example, the communication apparatus may be:

(1) an independent integrated circuit IC, a chip, or a chip system or subsystem;

(2) a set including one or more ICs, where optionally, the IC set may further include a storage component configured to store data and instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) others.

Figure 17:
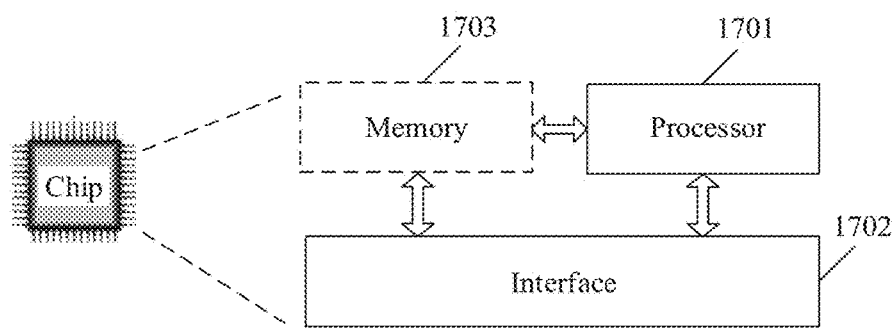
FIG. 17 is a schematic diagram of a structure of a chip according to an embodiment of this application.

For a case in which the communication apparatus may be a chip or a chip system, refer to a schematic diagram of a structure of a chip shown in FIG. 17. The chip 1700 shown in FIG. 17 includes a processor 1701 and an interface 1702. There may be one or more processors 1701, and there may be a plurality of interfaces 1702.

A case in which the chip is configured to implement a function of the terminal device in embodiments of this application is described below.

In an implementation, the processor 1701 is configured to: determine a frequency domain density K of a target reference signal based on a quantity $M_{RB}$ of frequency domain resources; and determine, based on the frequency domain density K, a third frequency domain resource that carries the target reference signal in a first frequency domain resource, and/or a fourth frequency domain resource that carries the target reference signal in a second frequency domain resource. The interface 1702 is configured to: receive, by using a first quasi co-location QCL assumption, the target reference signal carried on the third frequency domain resource, and/or receive, by using a second quasi co-location QCL assumption, the target reference signal carried on the fourth frequency domain resource.

In an implementation, the processor 1701 is configured to: determine a time domain density L of a target reference signal based on modulation and coding scheme MCS information; map the target reference signal once starting from a reference time domain resource block in a first time domain resource at an interval of L time domain resource blocks, to obtain a third time domain resource that carries the target reference signal; and/or map the target reference signal once starting from a reference time domain resource block in a second time domain resource at an interval of L time domain resource blocks, to obtain a fourth time domain resource that carries the target reference signal. The interface 1702 is configured to: receive, by using a first QCL assumption, the target reference signal carried on the third time domain resource, and/or receive, by using a second QCL assumption, the target reference signal carried on the fourth time domain resource.

A case in which the chip is configured to implement a function of the network device in embodiments of this application is described below.

In an implementation, the processor 1701 is configured to: determine a frequency domain density K of a target reference signal based on a quantity $M_{RB}$ of frequency domain resources; and determine, based on the frequency domain density K, a third frequency domain resource that carries the target reference signal in a first frequency domain resource, and/or a fourth frequency domain resource that carries the target reference signal in a second frequency domain resource. The interface 1702 is configured to: send, by using a first quasi co-location QCL assumption, the target reference signal carried on the third frequency domain resource, and/or send, by using a second quasi co-location QCL assumption, the target reference signal carried on the fourth frequency domain resource.

In another implementation, the processor 1701 is configured to: determine a time domain density L of a target reference signal based on modulation and coding scheme MCS information; map the target reference signal once starting from a reference time domain resource block in a first time domain resource at an interval of L time domain resource blocks, to obtain a third time domain resource that carries the target reference signal; and/or map the target reference signal once starting from a reference time domain resource block in a second time domain resource at an interval of L time domain resource blocks, to obtain a fourth time domain resource that carries the target reference signal.

The interface 1702 is configured to: send, by using a first QCL assumption, the target reference signal carried on the third time domain resource, and/or send, by using a second QCL assumption, the target reference signal carried on the fourth time domain resource.

Optionally, the chip further includes a memory 1703. The memory 1703 is configured to store program instructions and data that are necessary for the terminal device.

A person skilled in the art may further understand that various illustrative logical blocks and steps that are listed in embodiments of this application may be implemented by electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of embodiments of this application.

This application further provides a computer-readable storage medium. The computer-readable storage medium stores a computer program. When the computer-readable storage medium is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, embodiments may be implemented completely or partially in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid-state drive (SSD)), or the like.

A person of ordinary skill in the art may understand that various numerals such as "first" and "second" in this application are merely used for differentiation for ease of description, and are not used to limit the scope of embodiments of this application or represent a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatuses, and units, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A reference signal transmission method, comprising:
determining a frequency domain density K of a target reference signal based on a quantity $M_{RB}$ of frequency domain resources;
determining, based on the frequency domain density K, at least one of a third frequency domain resource that carries the target reference signal in a first frequency domain resource, or a fourth frequency domain resource that carries the target reference signal in a second frequency domain resource, wherein
the quantity $M_{RB}$ of frequency domain resources is greater than zero and less than $N_{RB}$, $N_{RB}$ is a quantity of scheduled frequency domain resources, and the scheduled frequency domain resources comprise the first frequency domain resource and the second frequency domain resource; and
the first frequency domain resource is associated with a first quasi co-location (QCL) assumption, and the second frequency domain resource is associated with a second QCL assumption; and
receiving, by using the first QCL assumption, the target reference signal carried on the third frequency domain resource, or receiving, by using the second QCL assumption, the target reference signal carried on the fourth frequency domain resource.

2. The method according to claim 1, wherein
a target reference signal port corresponding to the target reference signal carried on the third frequency domain resource is associated with a demodulation reference signal (DMRS) port corresponding to a DMRS carried on the first frequency domain resource; or
a target reference signal port corresponding to the target reference signal carried on the fourth frequency domain resource is associated with a DMRS port corresponding to a DMRS carried on the second frequency domain resource.

3. The method according to claim 1, wherein
$M_{RB}$ is obtained by dividing $N_{RB}$ by $N_{QCL}$ and performing a ceiling operation, or is obtained by dividing $N_{RB}$ by $N_{QCL}$ and performing a floor operation; and
$N_{QCL}$ is a total quantity of QCL assumptions associated with the scheduled frequency domain resources.

4. The method according to claim 1, wherein
$M_{RB}$ is equal to a quantity of first frequency domain resources, or is equal to a quantity of second frequency domain resources.

5. The method according to claim 1, wherein the determining, based on the frequency domain density K, at least one of a third frequency domain resource that carries the target reference signal in a first frequency domain resource, or a fourth frequency domain resource that carries the target reference signal in a second frequency domain resource comprises:
mapping a phase tracking reference signal (PTRS) once starting from a reference frequency domain resource block in the first frequency domain resource at an interval of K frequency domain resource blocks, to obtain frequency domain resource blocks that carry the target reference signal as the third frequency domain resource; or
mapping a PTRS once starting from a reference frequency domain resource block in the second frequency domain resource at an interval of K frequency domain resource blocks, to obtain frequency domain resource blocks that carry the target reference signal as the fourth frequency domain resource.

6. The method according to claim 1, wherein the target reference signal is a reference signal used to perform channel estimation or used with a DMRS in performing channel estimation.

7. The method according to claim 6, wherein the target reference signal comprises a PTRS.

8. A reference signal transmission method, comprising:
determining a frequency domain density K of a target reference signal based on a quantity $M_{RB}$ of frequency domain resources;
determining, based on the frequency domain density K, at least one of a third frequency domain resource that carries the target reference signal in a first frequency domain resource, or a fourth frequency domain resource that carries the target reference signal in a second frequency domain resource, wherein
the quantity $M_{RB}$ of frequency domain resources is greater than zero and less than $N_{RB}$, $N_{RB}$ is a quantity of scheduled frequency domain resources, and the scheduled frequency domain resources comprise the first frequency domain resource and the second frequency domain resource; and
the first frequency domain resource is associated with a first quasi co-location (QCL) assumption, and the second frequency domain resource is associated with a second QCL assumption; and
sending, by using the first QCL assumption, the target reference signal carried on the third frequency domain resource, or sending, by using the second QCL assumption, the target reference signal carried on the fourth frequency domain resource.

9. The method according to claim 8, wherein
a target reference signal port corresponding to the target reference signal carried on the third frequency domain resource is associated with a DMRS port corresponding to a demodulation reference signal DMRS carried on the first frequency domain resource; and/or
a target reference signal port corresponding to the target reference signal carried on the fourth frequency domain resource is associated with a DMRS port corresponding to a DMRS carried on the second frequency domain resource.

10. The method according to claim 8, wherein
$M_{RB}$ is obtained by dividing $N_{RB}$ by $N_{QCL}$ and performing a ceiling operation, or is obtained by dividing $N_{RB}$ by $N_{QCL}$ and performing a floor operation; and
$N_{QCL}$ is a total quantity of QCL assumptions associated with the scheduled frequency domain resources.

11. The method according to claim 8, wherein
$M_{RB}$ is equal to a quantity of first frequency domain resources, or is equal to a quantity of second frequency domain resources.

12. The method according to claim 8, wherein the determining, based on the frequency domain density K, at least one of a third frequency domain resource that carries the target reference signal in a first frequency domain resource, or a fourth frequency domain resource that carries the target reference signal in a second frequency domain resource comprises:
mapping a phase tracking reference signal (PTRS) once starting from a reference frequency domain resource block in the first frequency domain resource at an interval of K frequency domain resource blocks, to obtain frequency domain resource blocks that carry the target reference signal as the third frequency domain resource; or mapping a PTRS once starting from a reference frequency domain resource block in the second frequency domain resource at an interval of K frequency domain resource blocks, to obtain frequency domain resource blocks that carry the target reference signal as the fourth frequency domain resource.

13. The method according to claim 8, wherein the target reference signal is a reference signal used to perform channel estimation or used with a DMRS in performing channel estimation.

14. The method according to claim 13, wherein the target reference signal comprises a PTRS.

15. An apparatus, comprising:
a receiver;
at least one processor; and
one or more memories coupled to the at least one processor and storing programming instructions for execution by the at least one processor to cause the apparatus to:
determine a frequency domain density K of a target reference signal based on a quantity $M_{RB}$ of frequency domain resources;
determine based on the frequency domain density K, a third frequency domain resource that carries the target reference signal in a first frequency domain resource, or a fourth frequency domain resource that carries the target reference signal in a second frequency domain resource, wherein
the quantity $M_{RB}$ of frequency domain resources is greater than zero and less than $N_{RB}$, $N_{RB}$ is a quantity of scheduled frequency domain resources, and the scheduled frequency domain resources comprise the first frequency domain resource and the second frequency domain resource; and
the first frequency domain resource is associated with a first quasi co-location (QCL) assumption, and the second frequency domain resource is associated with a second QCL assumption; and
receive by using the first QCL assumption, the target reference signal carried on the third frequency domain resource, or receive, by using the second QCL assumption, the target reference signal carried on the fourth frequency domain resource.

16. The apparatus according to claim 15, wherein
a target reference signal port corresponding to the target reference signal carried on the third frequency domain resource is associated with a demodulation reference signal (DMRS) port corresponding to a DMRS carried on the first frequency domain resource; or
a target reference signal port corresponding to the target reference signal carried on the fourth frequency domain resource is associated with a DMRS port corresponding to a DMRS carried on the second frequency domain resource.

17. The apparatus according to claim 15, wherein
$M_{RB}$ is equal to a quantity of first frequency domain resources, or is equal to a quantity of second frequency domain resources.

18. The apparatus according to claim 15, wherein the programming instructions, when executed by the at least one processor, cause the apparatus to:
map a phase tracking reference signal (PTRS) once starting from a reference frequency domain resource block in the first frequency domain resource at an interval of K frequency domain resource blocks, to obtain frequency domain resource blocks that carry the target reference signal as the third frequency domain resource; or
map a PTRS once starting from a reference frequency domain resource block in the second frequency domain resource at an interval of K frequency domain resource blocks, to obtain frequency domain resource blocks that carry the target reference signal as the fourth frequency domain resource.

19. The apparatus according to claim 15, wherein the target reference signal is a reference signal used to perform channel estimation or used with a DMRS in performing channel estimation.

20. The apparatus according to claim 19, wherein the target reference signal comprises a PTRS.

* * * * *